US007853025B2

(12) United States Patent
Sleboda et al.

(10) Patent No.: US 7,853,025 B2

(45) Date of Patent: *Dec. 14, 2010

(54) VEHICULAR AUDIO SYSTEM INCLUDING A HEADLINER SPEAKER, ELECTROMAGNETIC TRANSDUCER ASSEMBLY FOR USE THEREIN AND COMPUTER SYSTEM PROGRAMMED WITH A GRAPHIC SOFTWARE CONTROL FOR CHANGING THE AUDIO SYSTEM'S SIGNAL LEVEL AND DELAY

(75) Inventors: Pawel W. Sleboda, Bloomfield Hills, MI (US); Robert J. True, Pleasant Prairie, WI (US); David J. Prince, Villa Park, IL (US); Jerome Ng, Ann Arbor, MI (US); David M. Emerling, West Bloomfield, MI (US)

(73) Assignee: Lear Corporation, Southfield, MI (US)

( * ) Notice: Subject to any disclaimer, the term of this patent is extended or adjusted under 35 U.S.C. 154(b) by 1458 days.

This patent is subject to a terminal disclaimer.

(21) Appl. No.: 11/251,980

(22) Filed: Oct. 17, 2005

(65) Prior Publication Data

US 2006/0034467 A1 Feb. 16, 2006

Related U.S. Application Data

(63) Continuation of application No. 10/049,993, filed as application No. PCT/US00/23476 on Aug. 25, 2000, which is a continuation-in-part of application No. 09/382,851, filed on Aug. 25, 1999.

(51) Int. Cl.
*H04B 1/00* (2006.01)

(52) U.S. Cl. .......................... 381/86; 381/361; 181/161

(58) Field of Classification Search .................. 381/86, 381/361, 365, 386, 296, 280, 99, 190, 186, 381/84–89, 59, 302, 389, 152, 341, 404; 181/144, 161, 296, 280

See application file for complete search history.

(56) References Cited

U.S. PATENT DOCUMENTS 4,385,210 A * 5/1983 Marquiss .................... 381/431

(Continued)

FOREIGN PATENT DOCUMENTS

EP 0411 786 A1 2/1991

(Continued)

OTHER PUBLICATIONS

Decision on Appeal, mailed Dec. 15, 2005, Appeal No. 2005-2549, U.S. Appl. No. 09/382,851.

(Continued)

*Primary Examiner*—Vivian Chin
*Assistant Examiner*—Lun-See Lao
(74) *Attorney, Agent, or Firm*—Brooks Kushman P.C.

(57) ABSTRACT

A vehicle overhead audio system, an electromagnetic transducer assembly for use therein and a computer system programmed with a graphic software control for changing the audio system's signal level and delay are provided where a headliner of the vehicle is a loudspeaker of the system thereby replacing many other loudspeakers and being invisible to the occupants. The headliner is driven in multiple zones that effect proper imaging for all occupants. Supplemental high frequency and subwoofer speakers and signal processing circuitry are included in one aspect of the invention.

60 Claims, 16 Drawing Sheets

U.S. PATENT DOCUMENTS

| | | | | |
|---|---|---|---|---|
| 4,641,345 | A | 2/1987 | Takahashi | |
| 4,792,978 | A | 12/1988 | Marquiss | |
| 4,856,071 | A | 8/1989 | Marquiss | |
| 4,897,877 | A * | 1/1990 | Tetzlaff | 381/302 |
| 5,193,118 | A | 3/1993 | Latham-Brown et al. | |
| 5,450,057 | A * | 9/1995 | Watanabe | 340/435 |
| 5,606,623 | A | 2/1997 | Bahm, III et al. | |
| 5,617,480 | A | 4/1997 | Ballard et al. | |
| 5,710,818 | A | 1/1998 | Yamato et al. | |
| 5,754,664 | A * | 5/1998 | Clark et al. | 381/86 |
| 5,887,071 | A | 3/1999 | House | |
| 5,901,231 | A | 5/1999 | Parrella et al. | |
| 6,058,196 | A | 5/2000 | Heron | |
| 6,181,797 | B1 | 1/2001 | Parrella et al. | |
| 6,332,029 | B1 * | 12/2001 | Azima et al. | 381/152 |
| 6,337,355 | B1 | 1/2002 | Yamashita et al. | |
| 6,356,641 | B1 | 3/2002 | Warnaka et al. | |
| 6,377,695 | B1 | 4/2002 | Azima et al. | |
| 7,050,593 | B1 * | 5/2006 | Emerling et al. | 381/86 |
| 2001/0012369 | A1 * | 8/2001 | Marquiss | 381/86 |

FOREIGN PATENT DOCUMENTS

| | | | |
|---|---|---|---|
| WO | WO 98/13942 | | 4/1998 |
| WO | WO 98/16409 | | 4/1998 |
| WO | WO 98/42536 | | 10/1998 |
| WO | WO 99/11490 | * | 3/1999 |

OTHER PUBLICATIONS

Board of Patent Appeals And Interferences Decision On Appeal; Mailed Dec. 15, 2005; Appeal No. 2005-2549; U.S. Appl. No. 09/382,851, filed Aug. 25, 1999; 12 pages.

Soren Bech, Electroacoustic Simulation of Listening Room Acoustics. Psychoacoustic Design Criteria, Audio Engineering Society, $89^{th}$ Convention Sep. 21-25, 1990, Los Angeles, USA, 34pp.

Junger, M, et al., Sound, Structures And Their Interaction, 1972, Cambridge, MA, MIT Press, pp. 234-236.

Pierce, A., Acoustics, Acoustical Society of America, Woodbury, NY, 1989, p. 128.

* cited by examiner

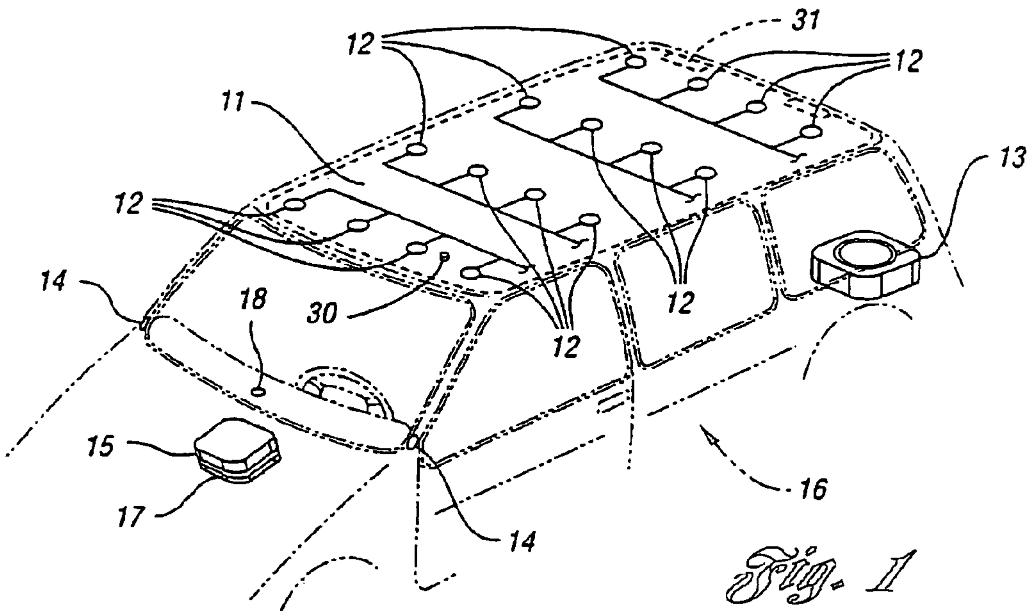
Fig. 1
Fig. 3
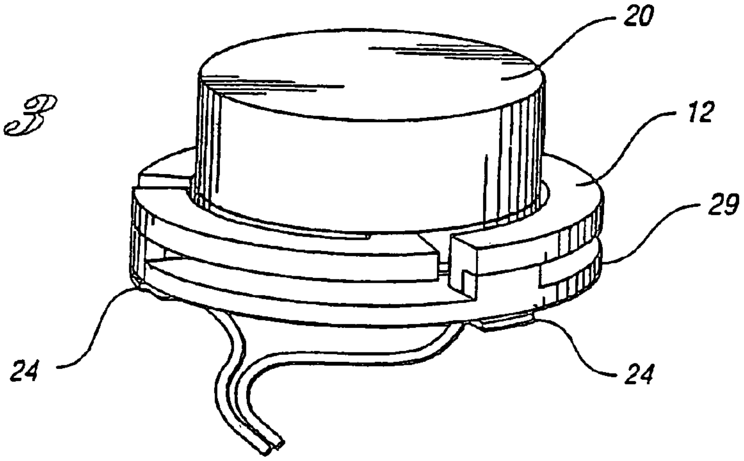
Fig. 4
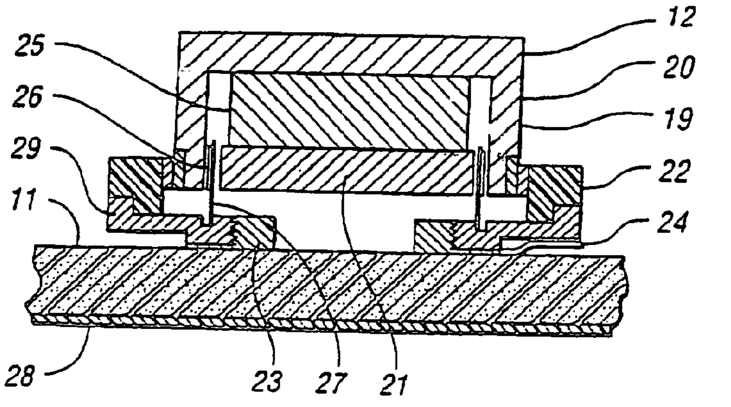

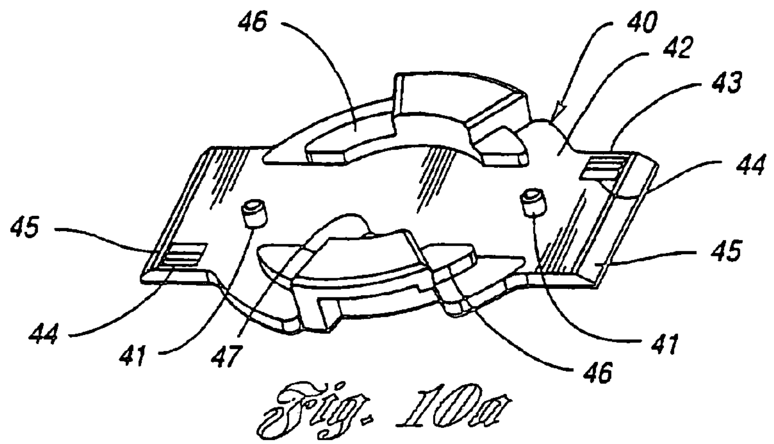
Fig. 10a
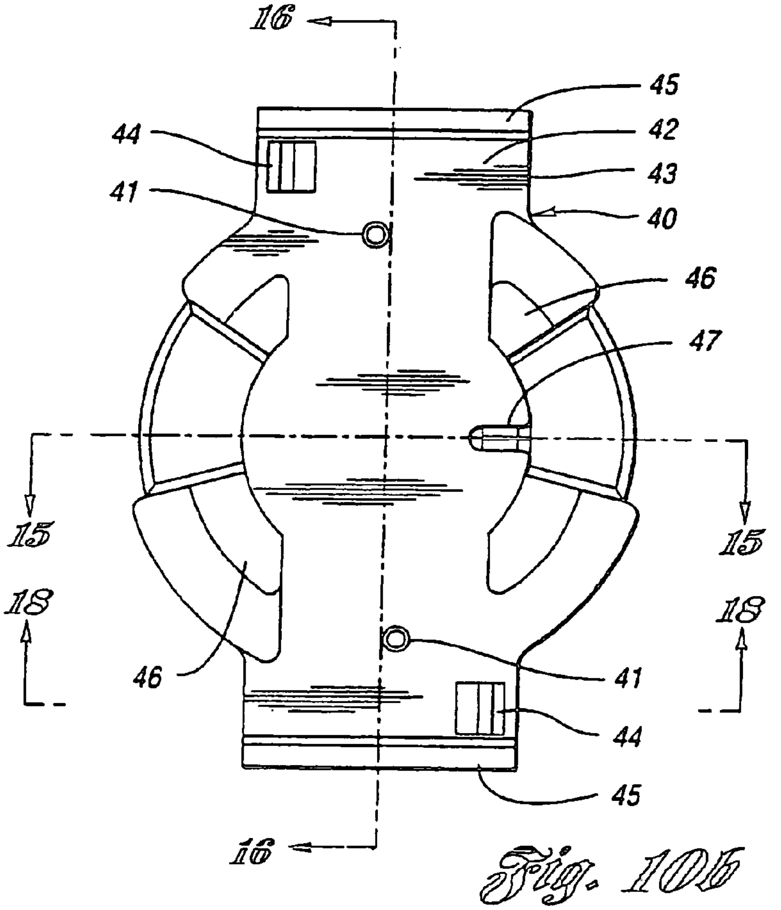
Fig. 10b
Fig. 11
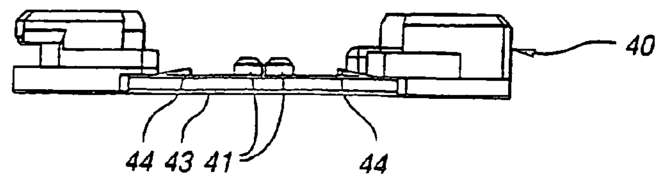

VEHICULAR AUDIO SYSTEM INCLUDING A HEADLINER SPEAKER, ELECTROMAGNETIC TRANSDUCER ASSEMBLY FOR USE THEREIN AND COMPUTER SYSTEM PROGRAMMED WITH A GRAPHIC SOFTWARE CONTROL FOR CHANGING THE AUDIO SYSTEM'S SIGNAL LEVEL AND DELAY

CROSS-REFERENCE TO RELATED APPLICATIONS

This application is a continuation of application Ser. No. 10/049,993 filed Apr. 2, 2002 (hereby incorporated by reference in its entirety), which is the National Stage of International Application No. PCT/US00/23476, filed Aug. 25, 2000 (hereby incorporated by reference in its entirety), which is a continuation-in-part of application Ser. No. 09/382,851, filed Aug. 25, 1999 (hereby incorporated by reference in its entirety).

BACKGROUND OF THE INVENTION

1. Technical Field

This invention relates to vehicular audio systems including a headliner speaker, electromagnetic transducer assemblies for use therein and a computer system for changing the audio system's signal level and delay.

2. Background Art

Traditionally, individual moving coil and cone loudspeakers are placed within the doors, instrument panel and rear tray and elsewhere in a vehicle for providing sound within the vehicle. These speakers add substantial weight to a vehicle, require individual installation and connection, occupy valuable interior trim space, allow significant road noise intrusion, and are subject to substantial shock and environmental abuse.

Most significantly, they are poorly positioned for listening. Their on-axis radiation is typically directed low in the vehicle toward occupants' legs and midsections rather than at the occupants ears. The direct sound from the speaker to the listener is typically far off-axis and highly variable in frequency response with typically insufficient high frequencies. In the high noise environment of a vehicle, this typically results in mid and high frequency audio information getting lost. "Imaging", the perception of where sound is coming from, is also adversely affected since the loudspeakers are low in the vehicle; for the front passengers, the audio image is pulled down into the doors while the rear passengers have an image to the side or rear instead of what should be presented in front of them.

As a solution to this problem, some proposed systems, including the system described in the Clark et al. U.S. Pat. No. 5,754,664, have incorporated small, lightweight loudspeaker drivers above the occupants in the headliner. However, because of their limited frequency range, speakers in the doors and/or rear package tray are still required. The noise paths through the door and rear package trays still exist and more noise paths through the roof (as occurs in rain) are opened with the new lightweight cone speakers in the headliner.

Making the drivers invisible would be difficult, since the small speakers are mounted onto the headliner; even if acoustically transparent fabric were placed over the drivers, the holes in the headliner would result in "read-thru" or visibility. Furthermore, the speakers are easily localized. This phenomenon is documented by Soren Bech in his paper "Electroacoustic Simulation of Listening Room Acoustics. Psychoacoustic Design Criteria", Audio Engineering Society, 89th Convention 21-25 Sep. 1990, Los Angeles, USA, 34pp. Overall, this approach increases complexity, cost, noise and weight without properly improving localization.

The Verity Group PLC has applied for a number of patents covering various aspects of flat panel loudspeaker (i.e., NXT) technology. The technology operates on the principle of optimally distributive modes of vibration. A panel constructed in accordance with this technology has a very stiff structure and, when energized, develops complex vibrations mode over its entire surface. The panel is said to be dispersive in that the shape of the sound wave traveling in the panel is not preserved during propagation.

Unfortunately, distributed mode panel loudspeakers require precise geometries for panel size, exciter placement and panel suspension thus limiting their size and integration capabilities into a headliner. Essentially, they would be separate speakers assembled into a hole in the headliner or onto the surface of the headliner. In the first case, they would also result in extra noise transmission (since the panels are extremely light) or in the second case, they would be visible to the occupants either as bumps or edges in typical headliner covering materials. In both cases, added complexity is the result.

From a sonic performance viewpoint, distributed mode panels suffer from poor low frequency response (typically restricted to 250 Hz and above for sizes integral to a headliner) and low output. Neither of these conditions make NXT panels suitable for headliner applications, particularly in a high noise environment. Furthermore, distributed mode panels are incapable of precise imaging, presenting instead a diffuse acoustic field perception where the sound appears to come from everywhere. While distributed mode panels might improve overall spaciousness, they would still require full range loudspeakers in the doors or rear package tray for sufficient acoustic output and other speakers in front for proper imaging.

In the Parrella et al. U.S. Pat. No. 5,901,231, driving portions of interior trim with piezo-electric elements to reproduce audio frequencies is disclosed. However, the use of piezo-electric elements restricts them to dividing up the trim into different sections for different frequency ranges adding complexity to the system. Furthermore, the excursion limits of piezo elements limits the output level and low frequency range of the trim panels such that conventional cone speakers would be required to produce lower frequencies. The piezo elements also require complicated integration into the trim element and are difficult to service. Lastly, the piezo elements require additional circuitry to convert typical output from an automotive head unit further complicating the system.

The Marquiss U.S. Pat. Nos. 4,385,210, 4,792,978 and 4,856,071 disclose a variety of planar loudspeaker systems including substantially rigid planar diaphragms driven by cooperating coil and magnet units.

The above-noted application entitled "Integrated Panel Loudspeaker System Adapted To Be Mounted In A Vehicle" describes flat panel systems with an electromagnetic drive mechanism integrated into an aperture in the panel. However, the driving mechanism that is integrated into the panel is constructed without steel pieces to contain, direct and concentrate the magnetic flux to its best advantage. The voice coil required is also relatively massive severely limiting the high frequency output. Thus, the output level is not adequate for typical audio performance. Furthermore, the aperture that the electromagnetic drive mechanism is insufficiently stiff to produce high frequency output.

The Heron U.S. Pat. No. 6,058,196 discloses a panel-form loudspeaker including a panel excited at frequencies above the panel's coincidence frequency to provide high radiation efficiency. "Coincidence frequency" is the frequency at which the wave speed in the vibrating panel equals wave speed in the surrounding air. As described in Junger, M. and Feit, D., "Sound, Structures and their Interaction", 1972, Cambridge, Mass., MIT PRESS, pp. 235-236, and Pierce, A., "Acoustics", ACOUSTICAL SOCIETY OF AMERICA, Woodbury, N.Y., 1989, p. 128, the coincidence frequency is dependent on a combination of material properties including the Young's modulus, panel thickness, material density and Poisson's ratio. Above the coincidence frequency, the panel becomes a much more efficient sound radiator.

Published PCT patent application No. WO 98/13942 discloses a vehicular loudspeaker system including a headliner driven by excited transducers in the form of piezo-driven devices.

Other related patent documents include: published PCT Patent Application Nos. 98/42536 and 98/16409; and U.S. Pat. No. 5,193,118.

Thus, even with the above prior advancements in flat speaker technology and overhead audio, prior audio systems have not been simplified. There is still a need to reduce parts and labor cost, decrease weight, decrease exterior noise penetration, provide believable imaging, reduce speaker visibility, increase reliability, and provide easy serviceability.

It is therefore desirable to provide an audio system which achieves the above by using existing trim panel space and mounting techniques, conventional audio signal head unit output, advanced material properties manipulation and well established signal processing, and psychoacoustic techniques.

DISCLOSURE OF INVENTION

An object of the present invention is to provide a vehicular audio system including a headliner speaker, electromagnetic transducer assembly for use therein and computer system for changing the audio system's signal level and delay wherein conventional full range cone loudspeakers located in doors, package trays, trunks, seats, and dashboards are replaced with a single multichannel headliner speaker thereby reducing weight, cost, and complexity of audio systems while freeing up valuable space formerly allocated for conventional speakers.

Another object of the present invention is to provide a vehicular audio system including a headliner speaker, electromagnetic transducer assembly for use therein and computer system for changing the audio system's signal level and delay wherein channel separation and distortion are minimized.

In carrying out the above object and other objects of the present invention, an audio system is provided for use in a vehicle having a roof. The system includes a headliner adapted to be mounted adjacent the roof so as to underlie the roof and shield the roof from view. The headliner has an upper surface and a sound-radiating, lower surface. The system also includes a source of audio signals and an array of electromagnetic transducer assemblies supported at the upper surface of the headliner. The system further includes signal processing circuitry coupled to the assemblies for processing the audio signals to obtain processed audio signals wherein the assemblies convert the processed audio signals into mechanical motion of corresponding zones of the headliner. The headliner is made of a material which is sufficiently stiff and low in density so that the headliner radiates acoustic power into the interior of the vehicle with a frequency range defined by a lower limit of 100 hertz or less and an upper limit of 12 kilohertz or more. The processed audio signals at a low end of the frequency range are matched to the processed audio signals at mid and high ends of the frequency range.

Preferably, the vehicle has a windshield and an array of electromagnetic transducer assemblies including at least one row of electromagnetic transducer assemblies adjacent the windshield. The at least one row of electromagnetic transducer assemblies are positioned 5 to 30 inches in front of an expected position of a passenger in the interior of the vehicle.

Also, preferably, the at least one row of electromagnetic transducer assemblies are positioned 12 to 24 inches in front of the expected position of the passenger. The at least one row of electromagnetic transducer assemblies includes at least two electromagnetic transducer assemblies spaced apart to correspond to left and right ears of the passenger in the expected position of the passenger.

Still, preferably, each of the electromagnetic transducer assemblies includes a magnet for establishing a magnetic field in a gap formed within the assembly, a coil which moves relative to the magnet in response to the processed audio signals, a base fixedly secured to the headliner on the upper surface and electrically connected to the signal processing circuitry and a guide member electrically connected to the coil and removably secured to the base for supporting the coil in the gap. The coils are electrically coupled to the signal processing circuit when the guide members are secured to their corresponding bases.

Preferably, each of the magnets is a high-energy permanent magnet such as a rare-earth magnet.

Each of the assemblies further includes a spring element having a resonant frequency below the lower limit of the frequency range when incorporated within the assembly. Each spring element is connected to its corresponding guide member for resiliently supporting its corresponding magnet above the upper surface of the headliner.

The array of electromagnetic transducer assemblies includes a front row of electromagnetic transducer assemblies positioned 5 to 30 inches in front of an expected position of a passenger in the interior of the vehicle and a back row of electromagnetic transducer assemblies positioned behind the expected position of the passenger. The signal processing circuitry delays the audio signals coupled to the back row of electromagnetic transducer assemblies relative to the audio signals coupled to the front row of electromagnetic transducer assemblies.

The array of electromagnetic transducer assemblies are preferably completely supported on the upper surface of the headliner.

Preferably, at least one loudspeaker is coupled to the signal processing circuitry and is adapted to be placed in the interior of the vehicle in front of an expected position of a passenger and below the headliner.

The headliner material may have a flexural (Young's) modulus between 1E7PA and 4E9PA and a density of between 100 and 800 kg/m$^3$.

Also, preferably, the headliner has a relatively high coincidence frequency to maximize channel separation, provide accurate imaging and minimize distortion wherein the coincidence frequency is greater than 12 KHz.

Still, preferably, the headliner has a structure which is broken at a flexure to minimize transfer of mechanical motion across the flexure.

Still, preferably, the audio system has a frequency response shape. The signal processing circuitry changes the shape of an equalization curve applied to the audio signals based on the signal level of the audio signals to maintain the frequency response shape relatively constant as the signal level of the audio signals change.

Further in carrying out the above objects and other objects of the present invention, an electromagnet transducer assembly is provided. The assembly includes a subassembly having a housing and a magnet for establishing a magnetic field within the housing and a coil which moves relative to the magnet in response to an audio signal. The subassembly also includes a flexible spider and guide member for supporting the coil centrally within the magnetic field. The assembly further includes a mating base for attaching the subassembly to a vehicle headliner wherein the subassembly is removably secured to the mating base by screwing, snapping or twisting.

Preferably the flexible spider includes a plurality of flexing legs circumferentially spaced about an outer periphery of the spider. Each of the flexing legs may have the shape of a sinusoidal wave.

Each of the flexible legs may have a pair of opposite end portions which taper to a relatively thin middle portion. In this embodiment, each of the flexing legs has at least one edge profile which follows a cosine function.

The assembly may include a bayonet-style coupling for mechanically connecting the spider and guide member to the base and electrically connecting the coil to a cable which supplies the audio signals after rotation of the spider and guide member, relative to the base under a biasing force. Preferably, the bayonet-style coupling includes an electrically conductive spring electrically connected to the coil and supported on the spider and guide member for supplying the biasing force and electrically connecting the coil to the cable.

The transducer assembly may further include at least one electrically conductive member disposed between the flexible spider and guide member and the mating base for electrically coupling the coil of a flat flexible cable disposed between the spider and guide member and the mating base upon securing the subassembly to the mating base. Preferably, the at least one electrically conductive member includes a pair of spaced, electrically conductive springs which urge the spider and guide member away from the mating base during securing of the subassembly to the mating base.

Preferably, the spider and guide member form a single part.

Also preferably, the coil includes a notch for aligning the coil on the spider and guide member to insure proper polarity of the coil.

Further in carrying out the above objects and other objects of the present invention, a computer system for controlling a digital signal processor which processes an audio signal of an audio system is provided. The computer system includes a computer adapted to be coupled to the digital signal processor and a display coupled to the computer for displaying a graph of signal delay versus signal gain of an audio signal to be manipulated by the digital signal processor. The computer system further includes an input device coupled to the computer for generating an input signal. The computer is programmed with a graphic software control to modify the graph in response to the input signal wherein level and delay of the audio signal are changed simultaneously.

The invention overcomes the problems of the prior art by: making the entire headliner the loudspeaker diaphragm; carefully choosing the diaphragm materials; and shaping and matching motors to provide proper imaging, high acoustic output, and wide frequency response with low distortion. The headliner diaphragm speaker becomes “invisible” and substantially all the conventional cone speakers that would be placed in doors, and front or rear package trays may be eliminated. The headliner diaphragm speaker is excited by subassembled drive motor assemblies that are entirely supported by the headliner.

According to one aspect of the invention, different sound zones may be created by in the headliner diaphragm speaker by placement of subassembled drive motors.

According to another aspect of the invention, the headliner diaphragm speaker and the subassembled drive motors are entirely supported by the headliner diaphragm speaker.

According to a further aspect of the invention, by properly placing the subassembled drive motors in relation to the listeners head, the sound image is naturally placed in front of the listener.

According to yet a further aspect of the invention, by properly shaping the headliner diaphragm, broadband frequency response, sufficient acoustic output, and accurate imaging are created from the headliner diaphragm speaker for each listener.

According to another aspect of the invention, by matching the mass of the subassembled drive motors to the headliner diaphragm speaker, broadband frequency response, high acoustic output, and detailed imaging are created from the headliner diaphragm speaker for each listener.

According to another aspect of the invention, by properly choosing materials for the headliner diaphragm speaker, broadband frequency response, sufficient acoustic output, and detailed imaging are created from the headliner diaphragm speaker for each listener.

According to another aspect of the invention, the diaphragm material and its shape is selected so that the speed and decay of sound in the headliner diaphragm is such that the sound zones do not overly conflict with other nearby zones.

According to another aspect of the invention, the diaphragm material is selected so that the speed and decay of sound in the headliner diaphragm speaker produce mechanical summing and mixing of discrete and/or phantom channels.

According to another aspect of the invention, by placing supplemental speakers in the A-pillars, sail panels, or instrument panel, imaging and high frequency response can be improved.

According to another aspect of the invention, by providing conventional signal processing techniques including delay and equalization of signals in time in the front, mid, and rear of the headliner diaphragm speaker, the imaging for all listeners can be improved.

According to another aspect of the invention, by providing head-related transfer function signal processing techniques, the imaging for all listeners can be improved.

According to another aspect of the invention, by providing switchable circuitry providing various signals to the subassembled drive motors, the response of the headliner diaphragm speaker can be changed for one or more occupants and for monaural, stereo, or multi-channel playback.

According to another aspect of the invention, cabin communication systems, voice activated controls, mobile communications and other multimedia events may be integrated and customized with the overhead audio system.

According to another aspect of the invention, signal processing, equalization, delays and amplification may be included within a unit integral to the headliner.

According to another aspect of the invention, a subassembled drive motor is defined as a subassembled electromechanical device for converting an electrical signal to a mechanical motion.

According to another aspect of the invention, the subassembled drive motors are easily installed and serviced with subassemblies that twist in or screw on to the headliner diaphragm. They can be installed as OEM equipment or can replace existing headliners as after-market product. The subassemblies are stand-alone operational units that can be tested for quality and performance before attachment to the headliner.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 is a perspective view of a vehicle, indicated by phantom lines, incorporating the audio system of the present invention;

FIG. 3 is a perspective view of an electromagnet transducer assembly of the present invention;

FIG. 4 is a sectional view, partially broken away, of one such assembly supported on a top surface of a headliner with its covering material;

FIG. 10*a* is a perspective view of a second embodiment of a mating base of the transducer assembly of the present invention;

FIG. 10*b* is a top plan view of the mating base of FIG. 10*a;*

FIG. 11 is a front elevational view of the mating base of FIG. 10*b;*

FIG. 40 is a front elevational view of a leg of yet another embodiment of a flexible spider which is tapered and wherein the leg has top and bottom edge profiles which follow a cosine function;

FIG. 44 is a view similar to FIG. 2 without a signal source or equalization on every channel and showing how a Dolby 5.1 system (on the left-hand side of the figure) would be realized as well as a stereo system (on the right-hand side of the figure).

BEST MODE FOR CARRYING OUT THE INVENTION

Figure 2:
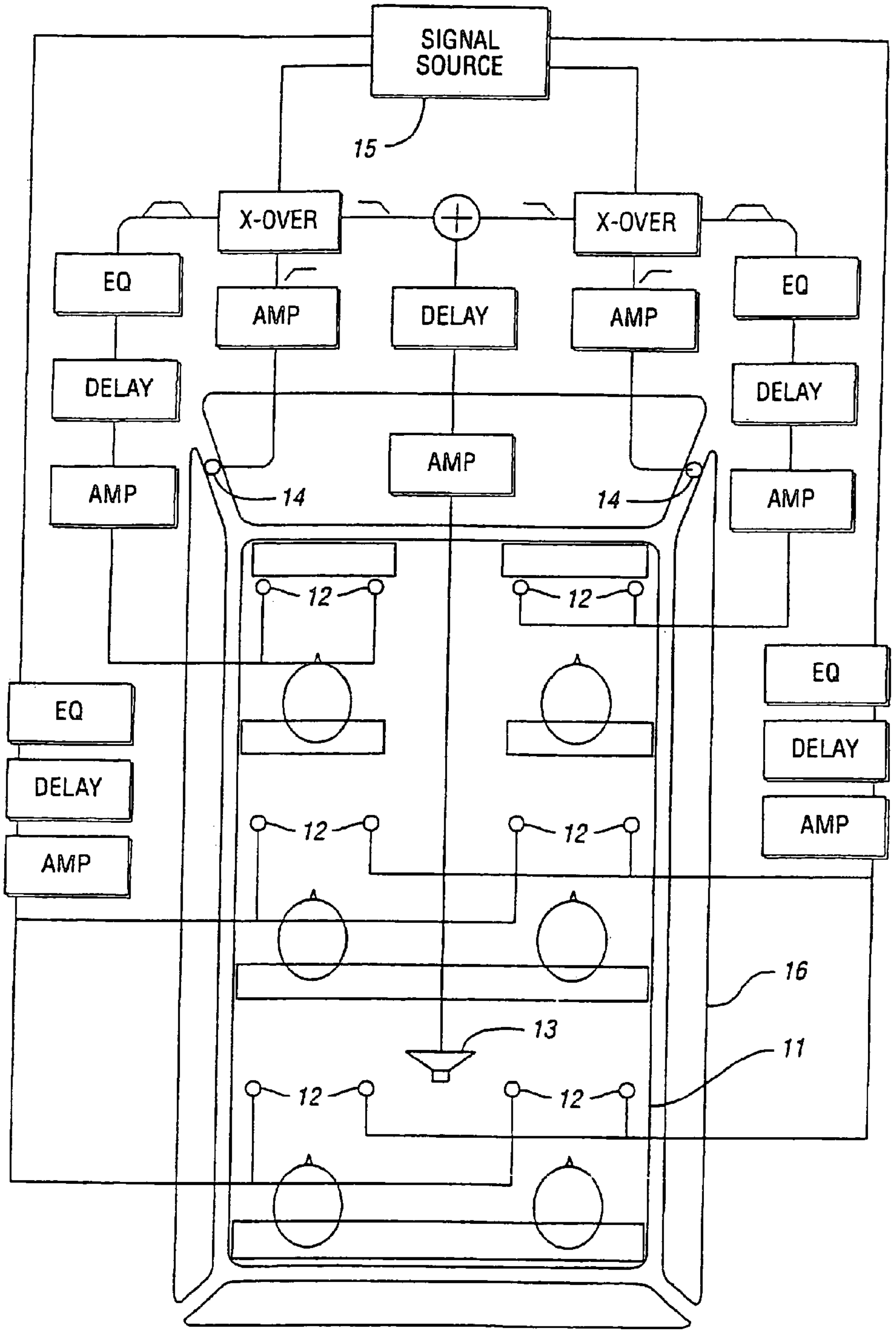
FIG. 2 is a top plan view of the vehicle of FIG. 1 with a signal source of audio signals, electromagnetic transducer assemblies positioned relative to expected positions of passengers, and signal processing circuitry indicated in block diagram form.
Figure 5:
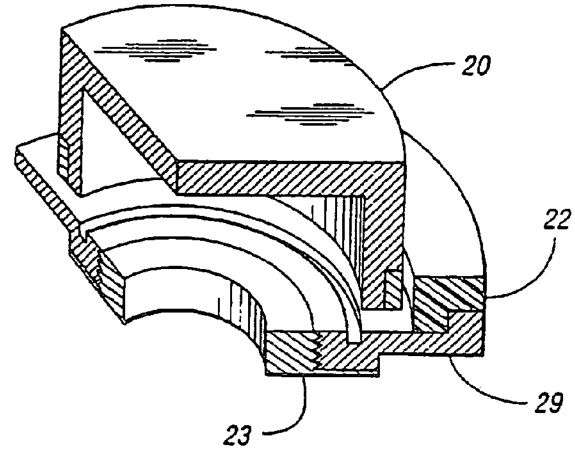
FIG. 5 is a perspective sectional view of a base, a guide member threadedly connected to the base, a spring element such as a "spider" connected to the guide member and a steel housing cup without a magnet or a top piece of the assembly.

Referring now to FIG. 1, there is illustrated a vehicle, generally indicated by reference numeral 16, including an audio system embodying the invention. The audio system includes either a commercially available audio or signal source 15 which may include a tuner, cassette player, compact disc player, DVD player, communications unit, etc. or a unit incorporating the above with additional signal processing circuitry to provide signal delays, equalization and amplification as described below. The additional signal processing including signal delays and amplification as described below may be incorporated into a separate unit 17.

Processed audio signals of the unified audio unit or the separate signal processing/amplifier unit 17 are conducted via audio cabling to electromagnetic transducer assemblies in the form of subassembled drive motors 12 that are affixed to a headliner 11 which operates as a headliner speaker diaphragm per the functional diagram shown in FIG. 2.

Audio signals that are high passed and undelayed, but possibly equalized, are also sent to the forward mounted tweeters or speakers 14. The forward mounted speakers 14 may be conventional speakers and may be anywhere in front of the driver for optimal frontal imaging by those skilled in the art. The forward mounted speakers 14 should have a frequency response extending up to a minimum of 17 KHz and as low in frequency as possible without adversely affecting the off-axis high frequency response. For audio systems supporting 5.1 and multichannel playback, additional forward mounted speakers 18 may be added in between the others.

Audio signals that are low passed, delayed and equalized are sent to a subwoofer 13 as illustrated in FIG. 2. The subwoofer 13 may be located anywhere in the vehicle 16 and delayed, crossed over and equalized to avoid localization and provide an even response.

The subassembled drive motors 12 are placed in front of each listener some 12-16" in front of the ears and to each side for optimal left-right signal separation as best shown in FIG. 2. The first row of subassembled drive motors is placed near the windshield of the vehicle 16, the second row is placed in front of the next seat to the rear such that they are forward enough from the second row occupants but not sufficiently close to the front row occupants to cause imaging confusion. Exact optimal dimensions depends on the degree of signal processing, output level and delay applied to each channel. The same technique is used for any subsequent rows of seating until one row of subassembled drive motors is placed behind the last row of listeners as shown in FIG. 1 but not FIG. 2.

Referring now to FIGS. 3-9, the subassembled drive motors 12 are designed and manufactured as individual electromechanical motors whose function is to convert electrical signals into mechanical motion. A permanent magnet field is achieved in a narrow voice coil gap 26 by use of a neodymium rare earth magnet 25 and a high permeability steel cup 20 and plate 21 pieces.

Figure 6:
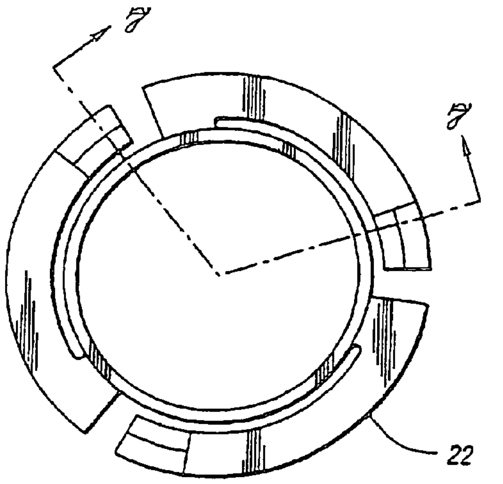
FIG. 6 is a top plan view of the spring element.
Figure 7:
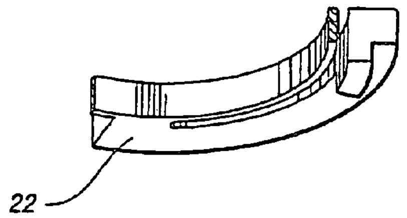
FIG. 7 is a one-third perspective view of the spring element from below taken along lines 7-7 of FIG. 6.
Figure 8:
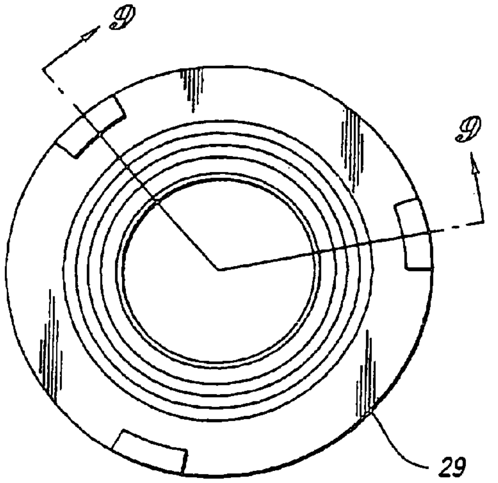
FIG. 8 is a top plan view of the guide member.
Figure 9:
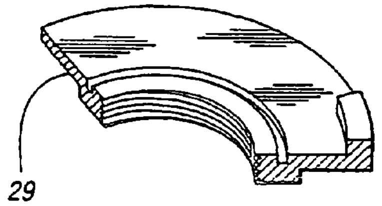
FIG. 9 is a one-third perspective view of the guide member from above taken along lines 9-9 of FIG. 8.
Figure 12:
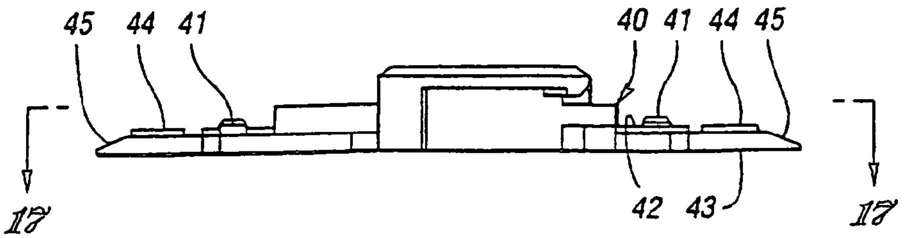
FIG. 12 is a side elevational view of the mating base of FIG. 10*b;*
Figure 13:
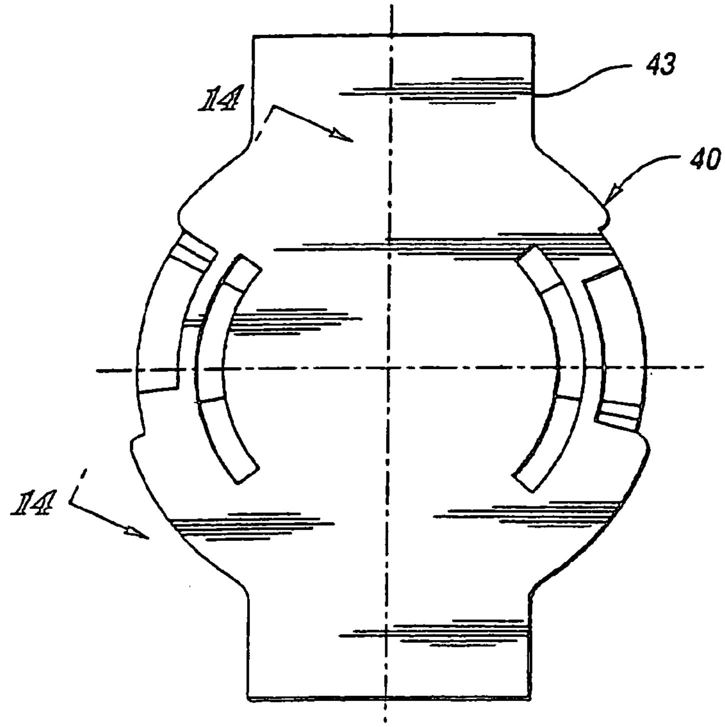
FIG. 13 is a bottom plan view of the mating base of FIG. 10*b;*
Figure 14:
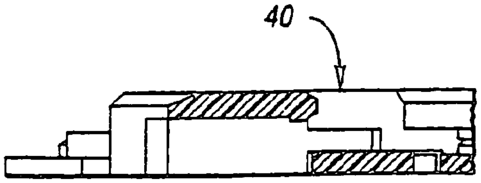
FIG. 14 is a sectional view taken along lines 14-14 of FIG. 13.
Figure 15:
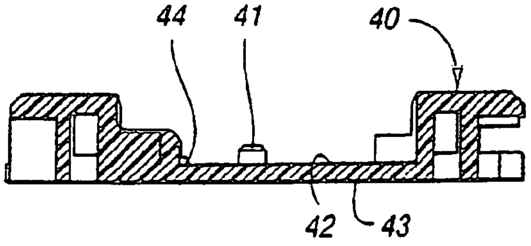
FIG. 15 is a sectional view taken along lines 15-15 of FIG. 10*b;*
Figure 16:
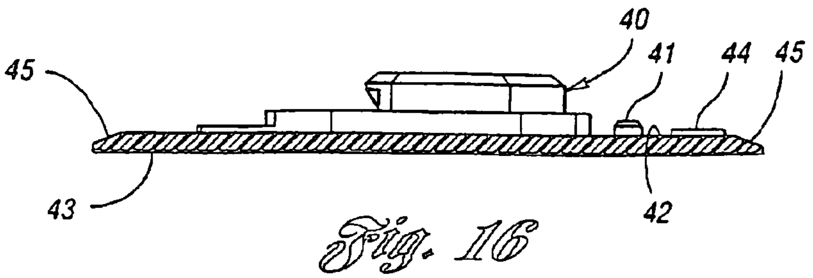
FIG. 16 is a sectional view taken along lines 16-16 of FIG. 10*b;*
Figure 17:
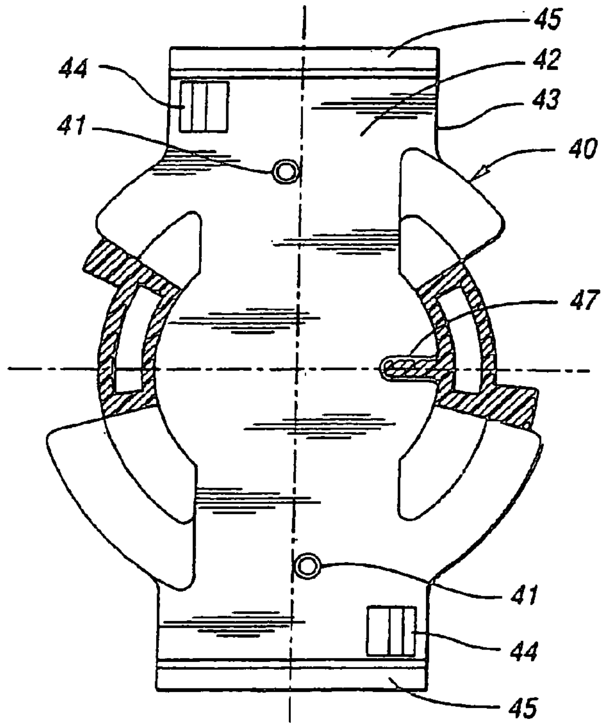
FIG. 17 is a sectional view taken along lines 17-17 of FIG. 12.
Figure 18:
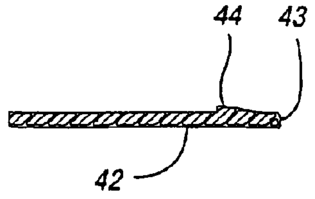
FIG. 18 is a sectional view taken along lines 18-18 of FIG. 10*b;*

The magnet 25, cup 20, and plate 21 are suspended by a one-piece, spider 22 tuned to a specific resonant frequency as illustrated in FIGS. 6 and 7. A guide member 29 illustrated in FIGS. 8 and 9 connected to the spider 22 serves to hold and center a voice coil 27 in the magnetic field gap 26 while removably attaching the rest of the subassembly to a motor base 23. The spider 22 and the guide member 29 could be made into one integral part.

The guide member 29 also contains two insert molded electrical contacts to which the voice coil 27 is soldered on one end and the other end mates with base contacts 24. The motor base 23 is directly adhered to the headliner 11 and contains insert molded electrical contacts that mate with the contacts of the guide member 29 on one end and are soldered to a signal wire (shown in FIG. 3) on the other end. Electrical contact between the base 23 and the guide member 29 may be made, for example, by metallizing the threads of the base 23 and the guide member 29.

The subassembled driver motors 12 are self-contained and designed to be assembled to the headliner 11 via the bases 23. Each assembly 12 both creates an acoustically efficient connection between the driving force of the motor and the headliner speaker diaphragm 11 and provides a means of making electrical contact between the voice coil 27 and the signal wires. Thus, each assembly 12 is simplified as mechanical and electrical connection is made in one screw, snap-in or twist-lock action. Furthermore, it provides an easy method of servicing the assembly 12 should one of them fail.

The subassembled drive motors or assemblies 12 are sized in dimension, weight, and contact area to match the stiffness, shape, density and suspension points of the headliner 11 or headliner speaker diaphragm. The excursion limits, power handling and efficiency of the subassembled drive motors 12 are also designed to match the physical characteristics of the headliner speaker diaphragm 11 and the air cavity between the headliner 11 and the diaphragm. In one application, the mass of the motor 12 is 94 grams, the resonant frequency is 50 Hz, the contact area is based on a 1" diameter voice coil 27, and the maximum excursion of the motor assembly 12 is 2.5 mm in either direction. The processed audio signals provided to the subassembled drive motors 12 thus causes mechanical motion which then moves the headliner speaker diaphragm 11 in accordance with the processed audio signal.

Boundary conditions of the headliner or panel 11 are not as critical as a distributed mode panel since the acoustic radiation is not dependent on the existence of modes within the panel 11. However, the boundaries do need to be controlled to avoid excessive rattling. To achieve this, the majority of the perimeter is clamped with a semi-compliant membrane. Additional compliant clamping occurs at the boundaries of dome lamps, consoles and other penetrations. Furthermore, all signal and power wires above the headliner 11 are either clamped, integrated into the headliner diaphragm material or mounted on top of the fibrous blanket material on top of the headliner.

Figure 35:
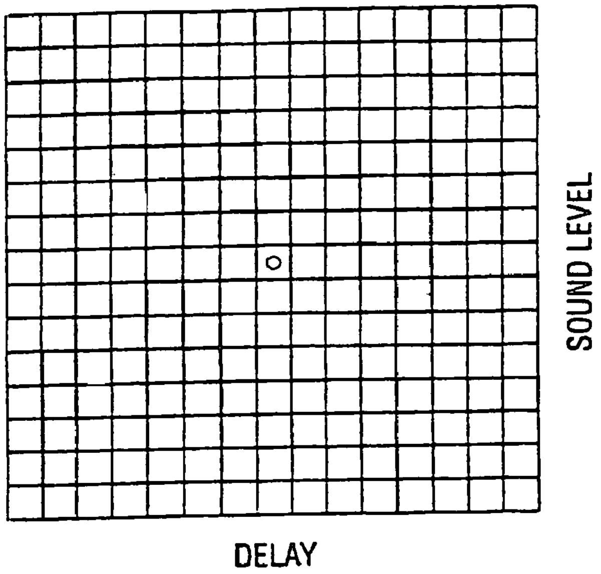
FIG. 35 is a display of a software control element that simultaneously changes level and delay and allows rapid tuning of the system.

In the preferred embodiment of the invention, the audio signal is first delivered to the high frequency speakers 14 as described above. Those skilled in the art of audio system tuning may then set the time delay and relative level of the audio signals delivered to the assemblies 12 on the headliner 11 so that the sound arriving at the occupant's ears enables the psycho-acoustic effect of precedence; this makes the image appear to come from in front of the occupants and not from the headliner 11 above. Since the precedence effect is both level and time dependent and since the interior acoustics dominate these settings, each vehicle 16 is tuned uniquely. The tuning applet, as shown in FIG. 35, aids in this process of setting the delay and level simultaneously.

In one instance of the invention, the audio signal fed to the front row of subassembled motors or assemblies 12 was delayed 7.5 milliseconds after the audio signal fed to the high frequency forward speakers 14. The subsequent rows of subassembled motors 12 were supplied with an audio signal delayed 25 milliseconds after the high frequency forward speakers 14. Additionally, the subwoofer audio signal, a sum of left/right and forward/rear signals per standard practice, was delayed to match the subassembled motors 12 closest to it.

The system design is complicated by the fact that all the subassembled motors 12 are mechanically moving a single headliner or speaker diaphragm 11. Since each subassembled motor 12 is individually reconfigurable, the headliner speaker diaphragm properties must be such that while providing adequate stiffness and light weight for adequate sound pressure and high frequency output, the vibration in the panel 11 must decay quickly enough or the speed of sound in the panel 11 must be slow enough that the signals from adjacent or distant subassembled motor 12 do not cause imaging problems. Those skilled in the art of tuning sound systems will realize that the acoustic vibration caused from the vibration of a forward motor 12 may reach the rear of the vehicle 16 thus causing imaging problems. Similarly, signals from the left channels may interfere with the right channels. These problems must be avoided by choosing proper materials and diaphragm construction dependent on individual vehicle constraints.

The headliner material has a stiffness (modulus of elasticity, Youngs modulus) between 1E7 Pa and 4e9 Pa and a density between 100 and 800 Kg/m^3. For one implementation of the preferred embodiment, the headliner 11 or speaker diaphragm is constructed of "wet" TRU (thermal foamable rigid urethane) of 8 mm thickness, Young's flexural modulus of 1.5e7, a density of 115 kg/$m^3$, and a damping of 4%. The headliner 11 is covered with a foam coverstock 28 for cosmetic and damping purposes. Although well established sound reinforcement guidelines of signal delay vs. signal level difference exist for success of precedence with discrete drivers, these must be modified to account for the proximal location of the headliner and the complex vibration characteristic of the headliner. This is typically accomplished through live tuning with the aid of the DSP software applet described below.

As mentioned above, the system can be modified for various applications. In general stereo playback mode, the drivers are typically split up so that left right channel separation is preserved throughout the length of the vehicle 16. Thus, through the use of delays as mentioned before, the audio image is preserved as in front of the vehicle 16 for all occupants. In the case of video playback, where the driver is not engaged in the video viewing, the front motor subassemblies 12 are turned off or muted and the first row of motor subassemblies 12 in front of the rear seats becomes the undelayed audio signal and the delay settings are reset based on that row being precedent. The audio image is naturally drawn up toward the headliner 11 and the raised screen. The rear subassembled motors 12 then are fed the surround mode for the entire vehicle 16. Center channel reproduction can be created by either switching the center subassembled drivers to the center channel or by splitting the center channel and summing with the left and right motors 12. The center channel is then created through mechanical mixing of the movement of the headliner 11.

Multiple phantom images can also be created between center and side subassembled motors 12 as the headliner 11 creates a real radiator between those two channels.

For program material desiring a non-localized audio image, the user or program mode of the head unit can easily adjust the delay settings to create a more spacious atmosphere in the interior or cabin of the vehicle 16.

Applications also extend to communications systems. One intra-cabin communication system places a microphone 30 on the surface of the headliner 11 in front of one or multiple passengers. Typical voice activated systems then distribute conversation throughout the cabin with cancellation of any non-conversational audio program signal. Gain before feedback is increased by nature of the localization of subassembled motors 12 and the near-field location of the microphone 30 within the panel 11. Additional cancellation DSP techniques can be employed to further increase gain before feedback.

Extra-cabin communication systems are easily integrated whether based upon cellular, digital or other systems. In this case, the overhead audio system allows the driver or other communicant to have the communication signals sent only to his local listening area while the other occupants continue to listen to standard program material.

Warning systems may also be integrated into the overhead system such that a local warning such as a door being ajar is delivered only to the driver and the passenger closest the area of concern without disturbing other occupants.

As signal processing capabilities increase, the incorporation of more and more localized equalization and effects becomes more economical to the point of effecting individualized user control for each zone within the limits of the acoustic space.

Uniquely approachable by the invention is the feasibility of incorporating noise cancellation techniques. The proximity of the listeners ears to the headliner speaker increase the rate of success as the sound field prediction and adjustment is less and less affected by the complexities of the acoustic environment.

Referring now to FIGS. **10*a* through 18, there are illustrated various views of a preferred base, generally indicated at 40, constructed in accordance with the present invention. The base 40 includes a pair of integrally formed posts 41 formed on an upper surface 42 of a base plate 43. Also formed on the upper surface 42 of the base plate 43 are a pair of locating members 44 for locating a flat flexible cable 80, as show in FIG. 34, on the upper surface 42. The cable 80 preferably includes a pair of holes 82 for sliding the cable 80 onto the posts 41. At opposite ends of the base plate 43 are inclined end portions 45 for gradually elevating the cable 80 onto the upper surface 42 of the base plate 43**.

The base 40 also includes an indexing portion 47 which extends inwardly toward the center of the base 40 and which overlays the cable 80 to ensure that the cable 80 does not flip over accidentally, thereby reversing polarity.

Figure 22:
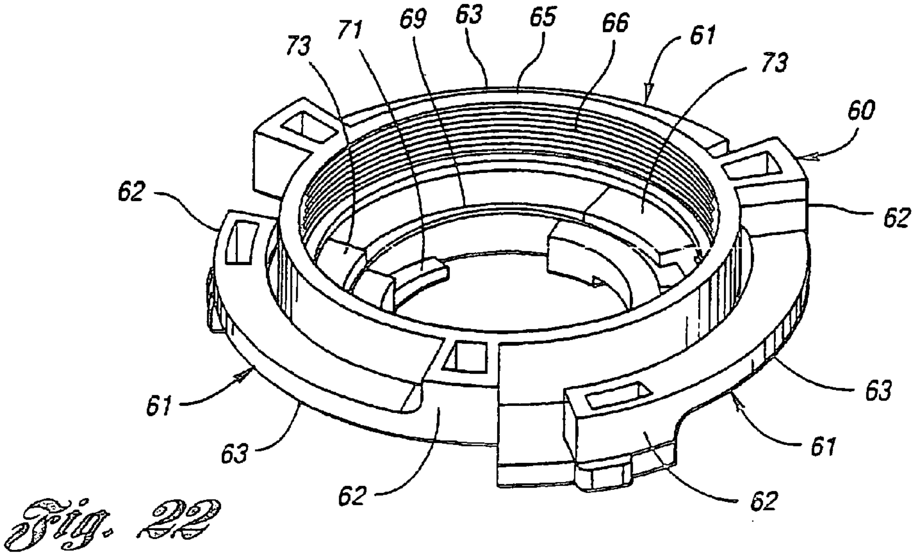
FIG. 22 is a schematic perspective view of spider and guide member, formed as a single part.

In general, the preferred design of the transducer assembly includes a "quarter turn" or "bayonet" style latching mechanism between a spider and guide member 60 of FIG. 22 and the base 40. This design includes catching portions 46 of the base 40 and a sliding portion 71 of the guide member 60. During installation, the guide member 60 is positioned on top of the base 40 with the catching portions 46 aligned with sliding portions 71 of the guide member 60. The guide member 60 is then lowered into the base 40 until the guide member 60 sits on the base 40. At this point the guide member 60 is then allowed to turn, allowing the sliding portions 71 to move into pockets of the catching portions 46. The posts 41 on the base 40 and holes 66 in the guide member 60 provide a positive locking feature and tactile feedback that the guide member 60 has locked into position.

The advantage of this design is that this provides the user control of the location of the guide member 60 as it is fastened into the base 40. This feature is important for the electrical contacts that will be described next.

Electrical Contacts

Figure 34:
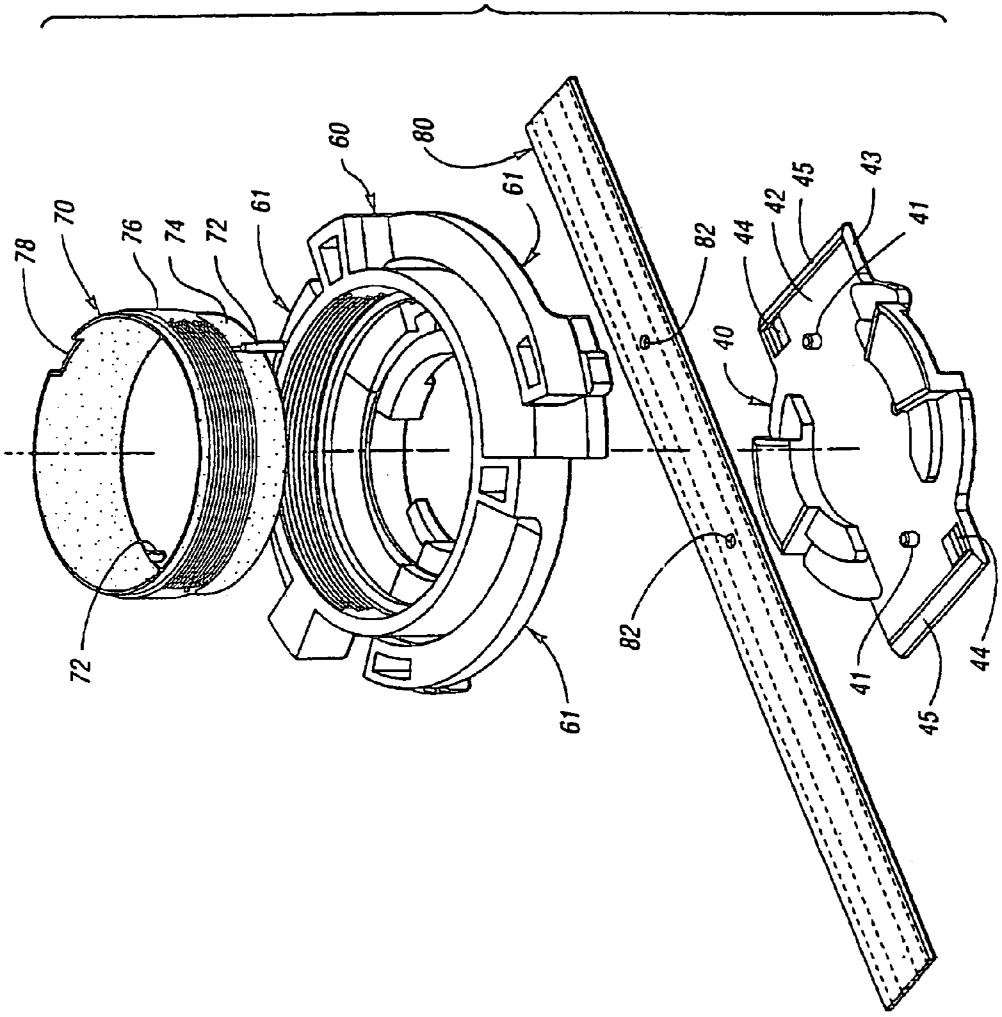
FIG. 34 is an exploded perspective view of the transducer assembly with a flat flexible cable of the second embodiment of the present invention.

The purpose of the electrical contacts 50 of the system of the present invention is to provide audio signal to the voice coil 70, which, in turn, excites the rest of the transducer assembly to create sounds in the vehicle component. These contacts 50 apply to round wire, flat flexible cable or any conducting medium which supply audio signals. The ends of these contacts are soldered or coupled to pins 72 of the voice coil 70. FIG. 34 is an exploded perspective view of the transducer assembly.

Flat Flexible Cable (FFC) technology and the electrical contacts 50 provide an electrical interface for the system of the invention. In this design, the FFC is located on the base 40 which has the members 44 that retain the FFC in position. In the section of the FFC that comes in contact with a bowed portion 56 of the contact 50, part of the insulation has been trimmed so that the electrical conductors of the FCC are exposed.

The contacts 50 on the other hand are attached (such as by insert molding) at the lower surface of the guide member 60. As the guide member 60 is loaded into the base 40 and it rotates to latch together, the end portions 52 of the contacts 50 line up with the FFC conductors and create an electrical connection.

Figure 19:
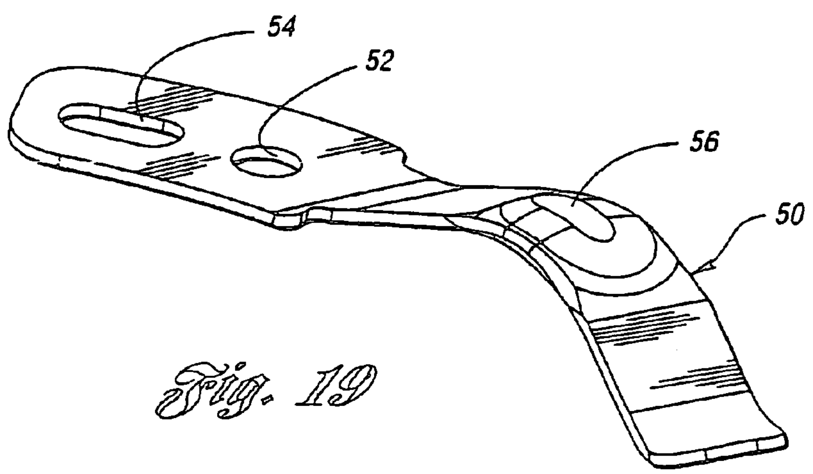
FIG. 19 is a schematic perspective view of an electrical spring contact of the transducer assembly of the present invention.
Figure 20:
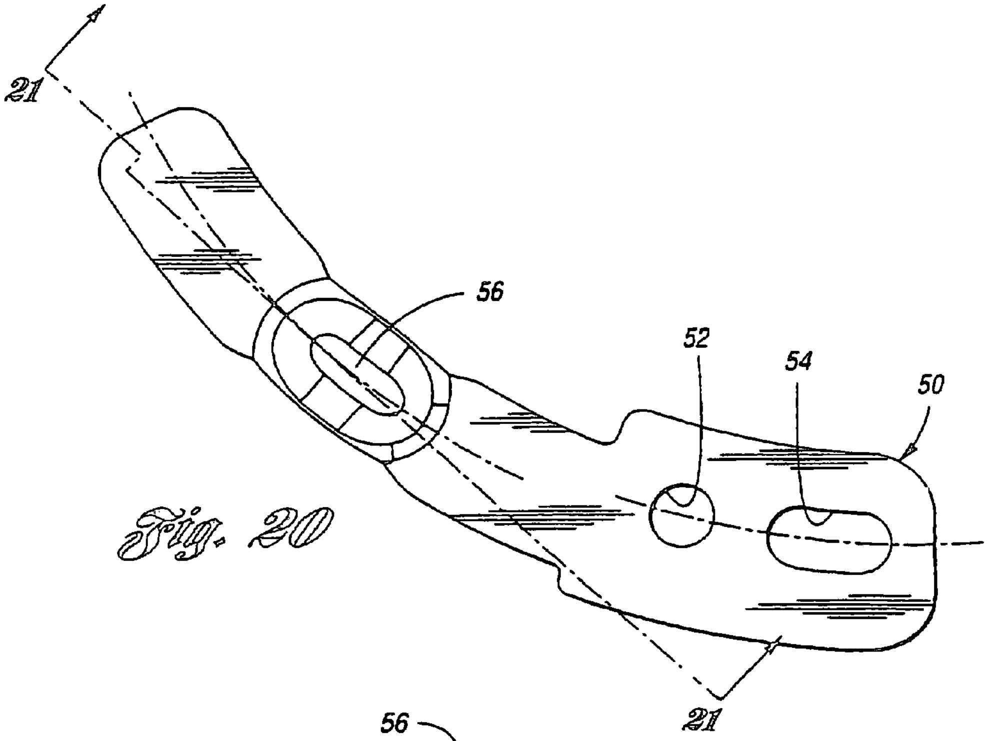
FIG. 20 is a bottom plan view of the electrical spring contact of FIG. 19.
Figure 21:
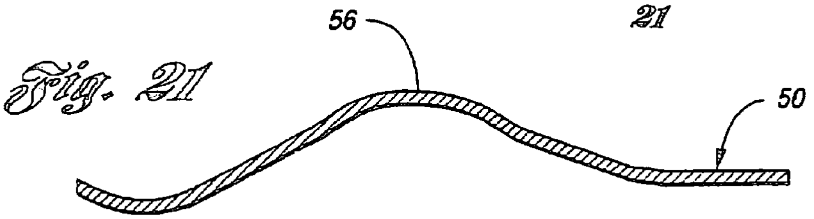
FIG. 21 is a sectional view taken along lines 21-21 of FIG. 20.

Referring now to FIGS. 19-21, there is illustrated one of the electrical spring contacts, generally indicated at 50, of the present invention. Each of the spring contacts 50 includes an aperture 52 which is aligned with post 41 of the base 40 to receive and retain the post 41 therein when aligned. The spring contact 50 also includes an aperture 54 which receives and retains therein pins 72 of the coil 70 illustrated at FIGS. 30-34. The bowed portion 56 of the spring contact 50 is adapted to electrically contact a bare or exposed electrical connector of the flat flexible cable 80 after the guide 60 and the base 40 have been locked in position.

Referring now to FIGS. 22-29, there is illustrated in detail the guide member 60 of the present invention. The guide member 60 includes a plurality of flexible legs generally indicated at 61 to form a flexible spider. Each of the flexible legs includes a pair of end portions 62 and a central middle portion 63.

Figure 23:
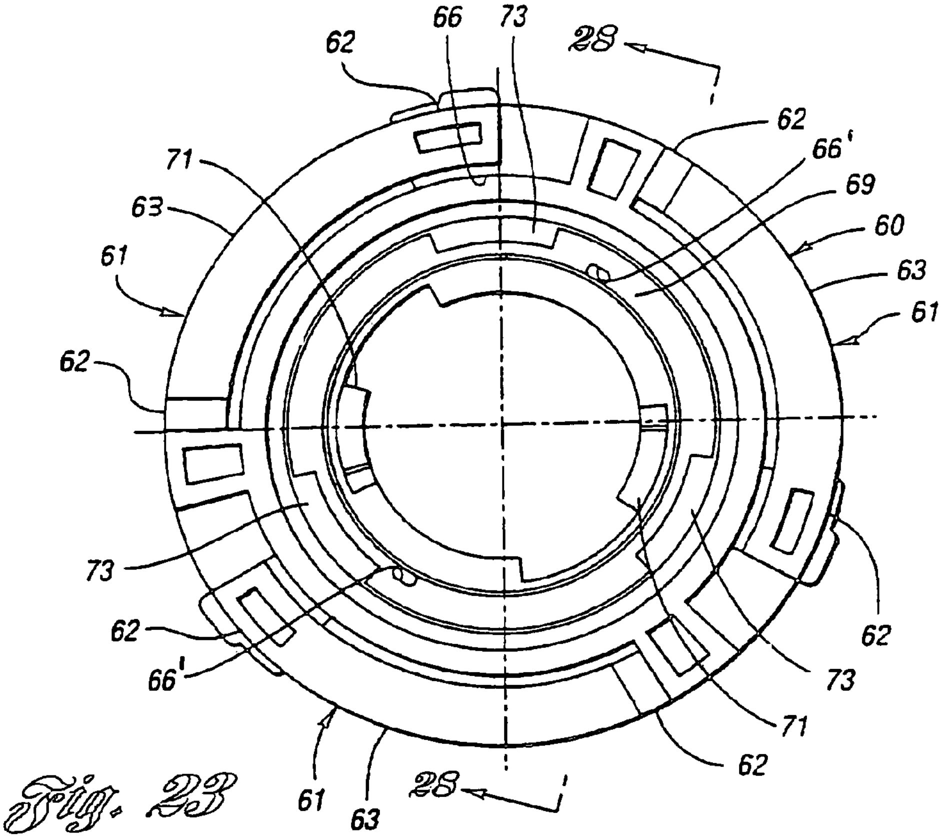
FIG. 23 is a top plan view of the spider and guide member of FIG. 22.

The guide member 60 also includes a cylindrical portion 65 having a threaded inner surface 66. The threaded inner surface 66 threadedly receives and retains a threaded steel cup (not shown) which houses a magnet (not shown) and plate pieces (not shown) as in the first embodiment of the invention of FIG. 4. Also, an adhesive may also be used to fill any voids between the steel cup and the threads of the plastic guide 60 to ensure that the plastic guide 60 and the steel cup do not separate from each other during use. The adhesive, in effect, creates mating threads for the threads on the inner surface 66. Holes 66' are formed in a lower surface of the guide member 60 as shown in FIG. 23 to receive and retain therein the pins 72 of the coil 70.

Figure 24:
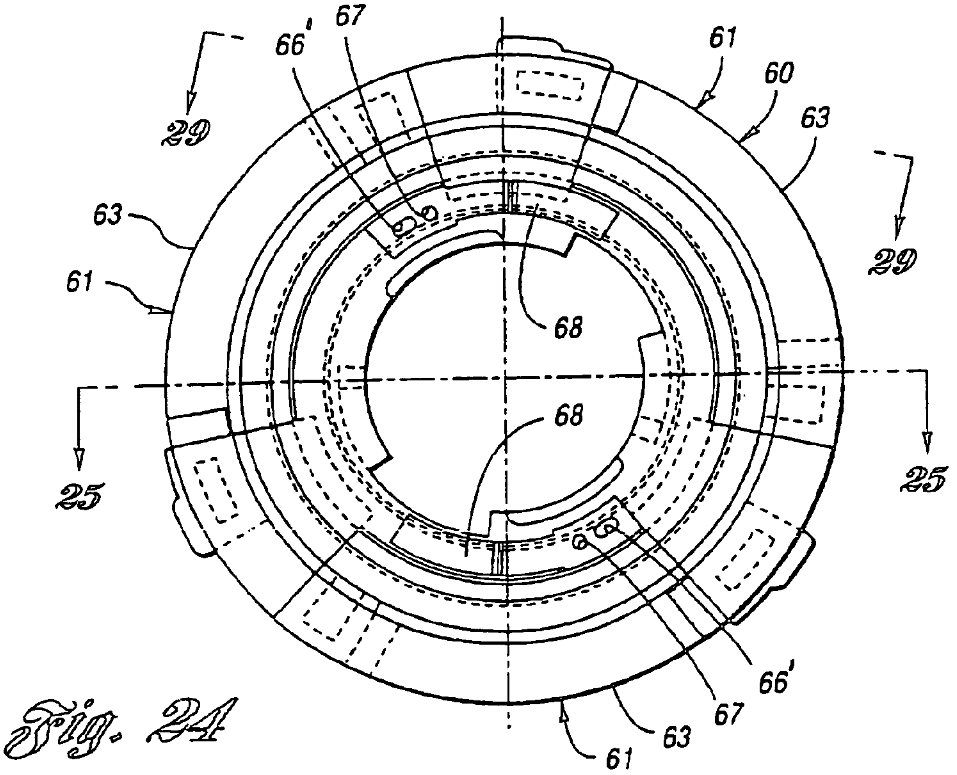
FIG. 24 is a bottom plan view of the spider and guide member of FIG. 22.
Figure 25:
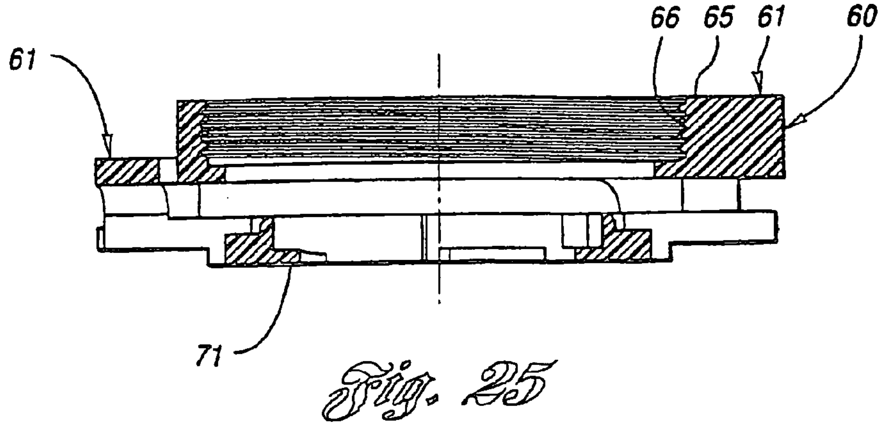
FIG. 25 is a sectional view taken along lines 25-25 of FIG. 24.
Figure 26:
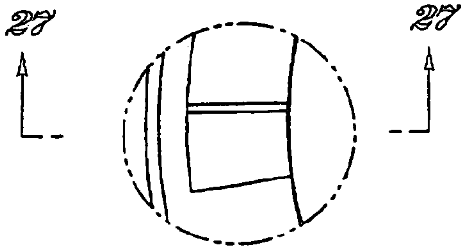
FIG. 26 is an enlarged view of a circular portion of FIG. 23.

When the spring contact 50 is insert molded within the guide 60, the hole 52 formed in the spring contact 50 is aligned with a hole 67 formed in the guide 60 wherein the spring contact 50 is located in an area 68 on opposite sides of the guide 60 at a lower surface thereof as shown in FIG. 24.

Figure 27:
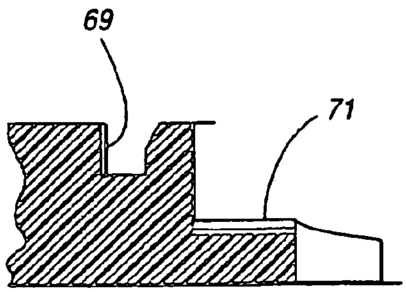
FIG. 27 is a sectional view taken along lines 27-27 of FIG. 26.
Figure 28:
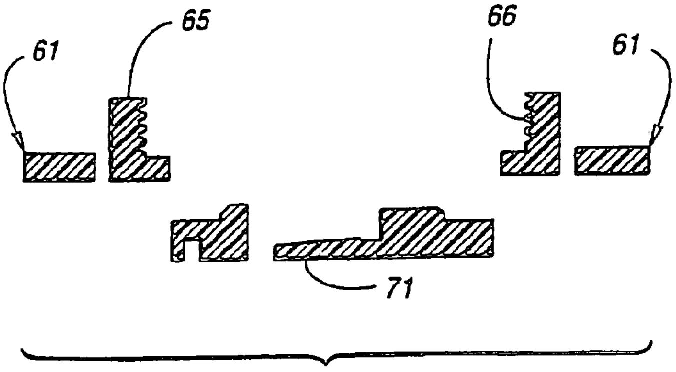
FIG. 28 is a sectional view taken along lines 28-28 in FIG. 23.
Figure 29:
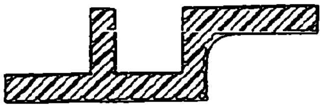
FIG. 29 is a sectional view taken along lines 29-29 in FIG. 24.
Figure 30:
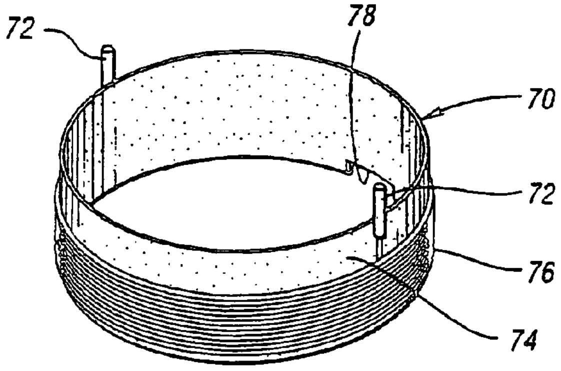
FIG. 30 is a schematic perspective view of a coil of the transducer assembly of the present invention.
Figure 31:
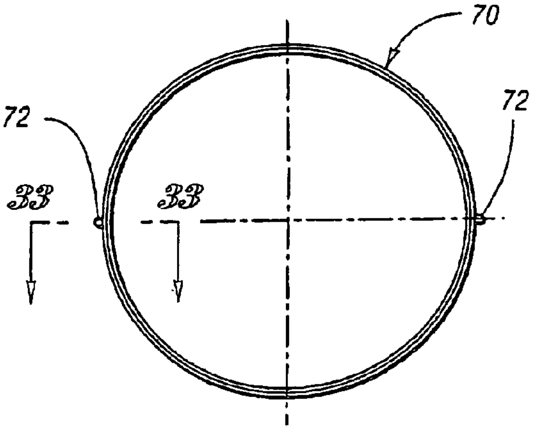
FIG. 31 is a top plan view of the coil of FIG. 30.
Figure 32:
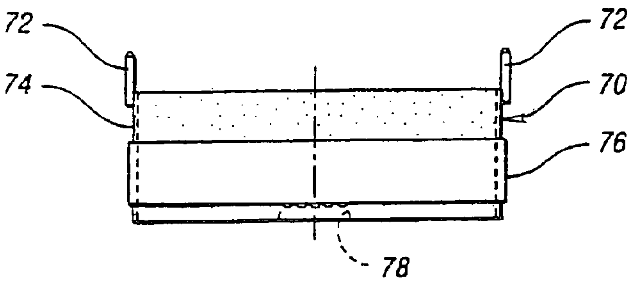
FIG. 32 is a side elevational view of the coil of FIG. 30.
Figure 33:
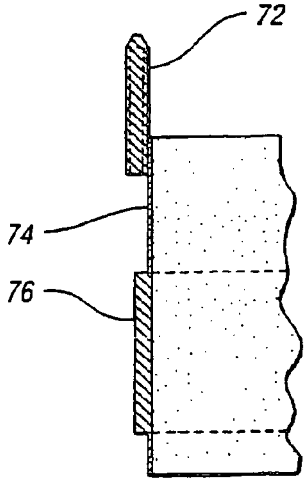
FIG. 33 is an enlarged sectional view, partially broken away, taken along lines 33-33 of FIG. 31.

The guide 60 also includes an area in the form of a circumferential groove 69 for receiving and retaining the coil 70 therein as shown in FIG. 27.

Also located at a lower surface of the guide 60 are a pair of opposing bayonet portions 71 for securing the guide 60 to the base 40 in a bayonet fashion as previously described.

Also formed within the guide 60 are guide members 73 for laterally supporting the coil 70 within the groove 69.

Referring now to FIGS. 30-33, the coil 70, as previously mentioned, includes pins 72 formed on a bobbin 74. Preferably, the pins are soldered to wire 76 of bobbin 74. The coil 70 also includes a notch 78 formed therein to insure proper positioning of the coil 70 within the guide 60 to insure that the proper polarity of the coil 70 within the guide 60 is maintained during assembly.

Referring now to FIG. 35, there is illustrated graphically a software application is used in tuning of the system or any time delay system. Since the perception of echoes in multiple sound source systems is dependent on both the signal delay (in time) and the level difference between the two it is desirable to manipulate both at the same time. The gain delay plane is created with the delay on the x axis and the signal gain on the y axis with a dot for each audio signal to be manipulated. By clicking on a delay with a mouse of a computer system, the user may simultaneously alter the signal level and the signal delay by moving the dot in either axis or both at the same time. The readout of the delay is given which allows the user to enter gain and delays numerically.

Figure 36:
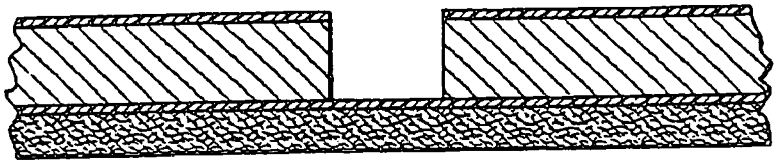
FIGS. 36-38 are views, partially broken away and in cross section, showing various methods of breaking the structure of the headliner diaphragm to minimize vibration transfer between adjacent zone sections and for other boundaries of the headliner diaphragm.
Figure 37:
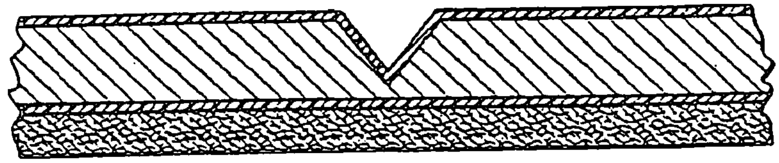
Figure 38:
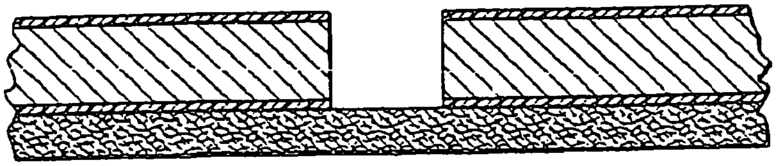

Referring now to FIGS. 36-38, there are illustrated methods for breaking the structure of the headliner diaphragm to minimize vibration transfer to either adjacent sound zone sections or to other boundaries of the headliner diaphragm such as a console, dome light, sunvisor, etc.

Several representative methods are shown in FIGS. 36-38. For example, the sandwich panel is shown where the top and middle layers are either cut or depressed to create a flexure point in the panel. The lower layer may also be severed so that only the cover stock finish material is continuous.

Figure 39:
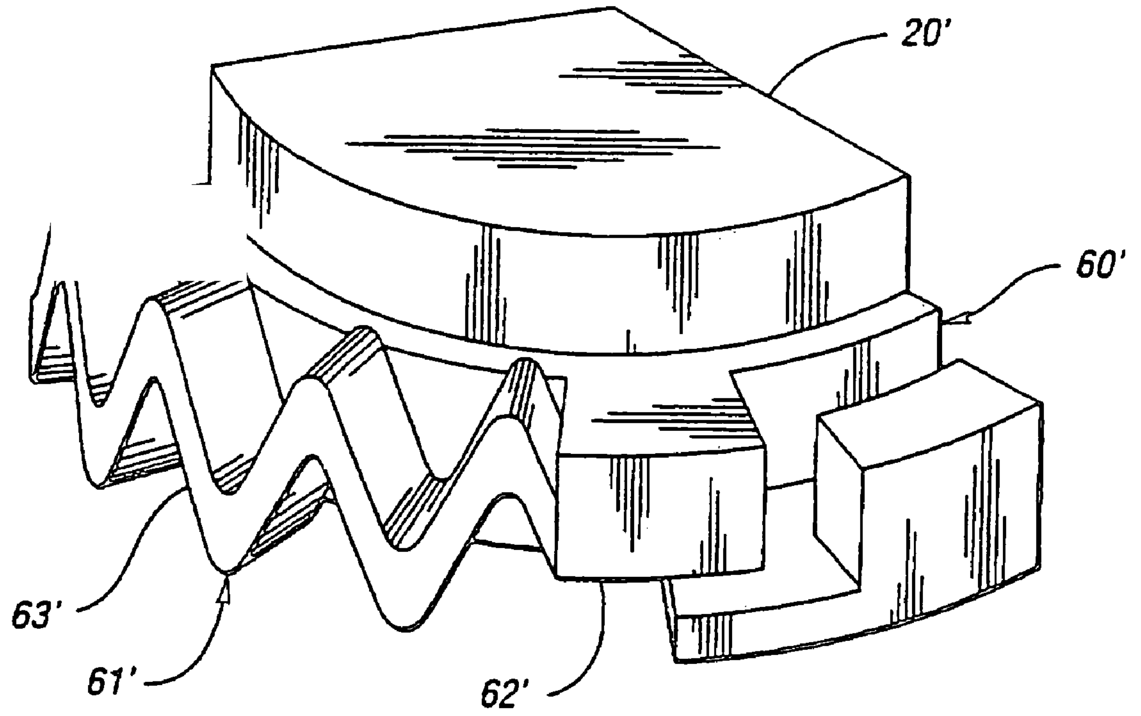
FIG. 39 is a one-quarter, perspective view of another embodiment of a transducer assembly wherein a leg of the flexible spider has a sinusoidal wave pattern.

The driver spider, i.e., the plastic legs of the guide 60 which flex may be designed and improved to reduce stress and increase endurance. Two techniques may be employed to reduce stress in the flexing legs without increasing resonance of the guide 60. As illustrated in FIG. 39, the first technique is to lengthen legs 61' by creating a sinusoidal wave pattern. This essentially allows a thicker, longer leg to be implemented within the same radial angle.

As illustrated in FIG. 40, the second technique utilizes a taper to a leg 61" to thin it out at the middle and spread the stress more evenly in the leg 61". The shape shown in FIG. 40 has top and bottom edge profiles which follow a cosine function with the bottom profile mirroring the top profile. In other words, the leg 61" starts out thick (the peak of the cosine wave) and reaches its thinnest point (the other peak of the cosine wave) at the center.

Figure 41:
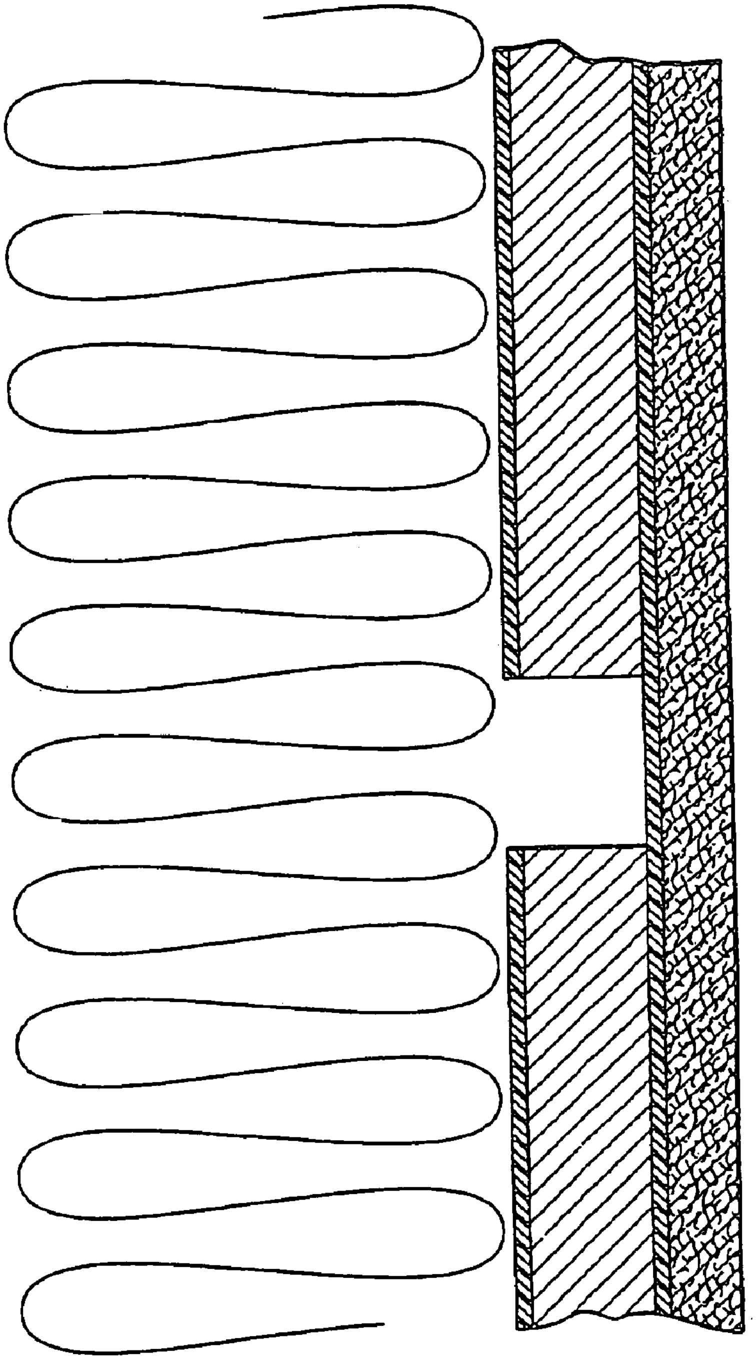
FIG. 41 is a view, partially broken away and in cross section, similar to the view of FIG. 36 and further including insulation material in the form of standard batt insulation such as fiberglass.

Referring now to FIG. 41, there is illustrated an insulation material for use with the headliner. FIG. 41 illustrates the notched headliner of FIG. 36 together with standard batt insulation. The insulation may be fiberglass or some other user-friendly material with favorable sound absorption properties.

Figure 42:
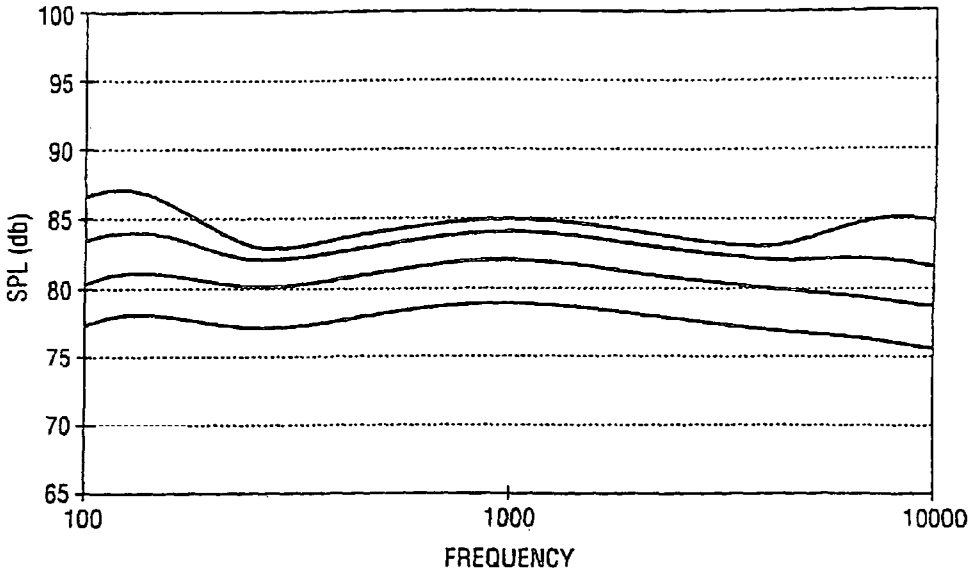
FIG. 42 is a series of curves of SPL versus frequency showing mid-band compression.
Figure 43:
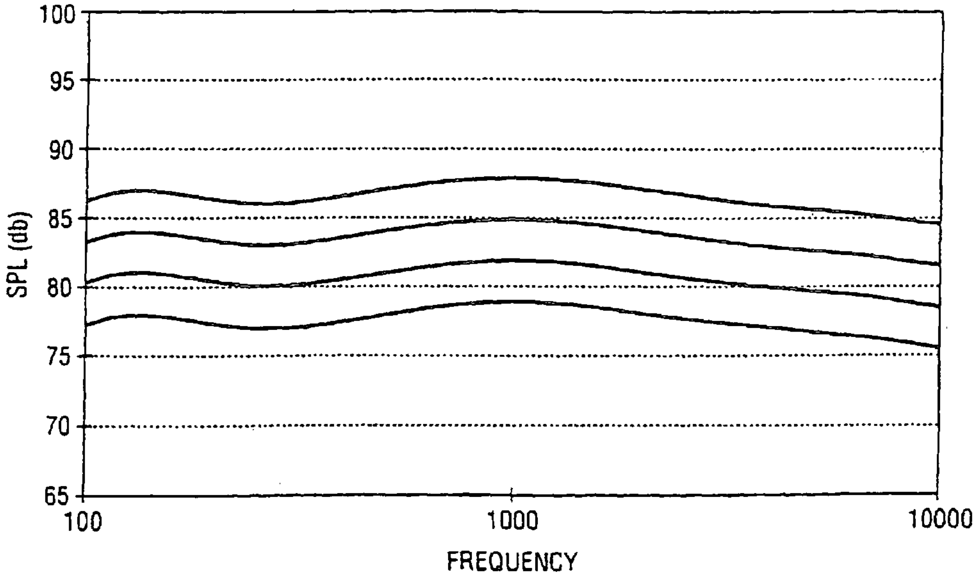
FIG. 43 is a series of curves similar to the curves of FIG. 42 showing SPL after the compression has been corrected by signal processing circuitry of the present invention.
Figure 14:
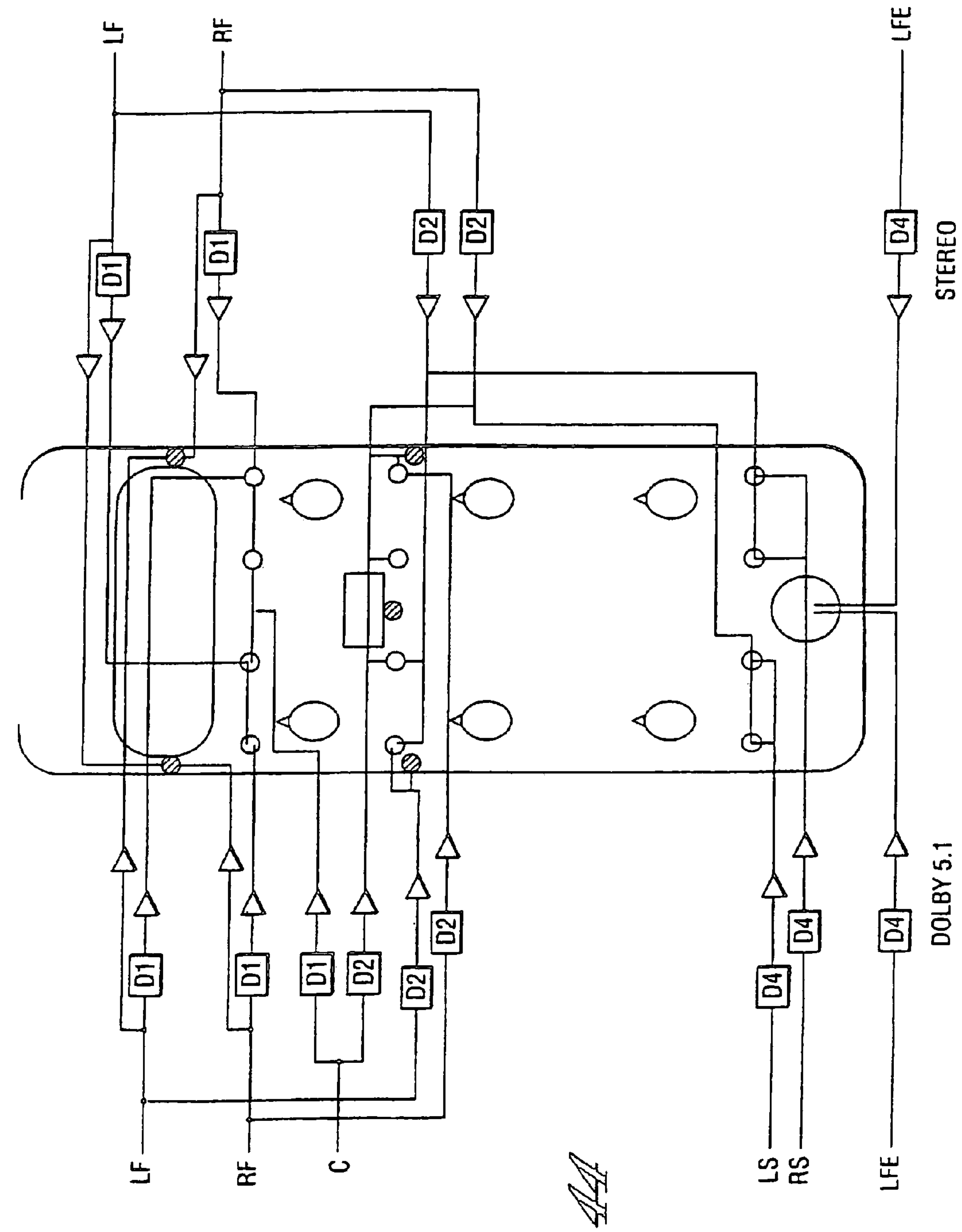

Referring now to FIG. 42 and to FIG. 43, there is illustrated a pair of graphs showing compression effects. Four curves are illustrated in each of the graphs of FIGS. 42 and 43. The curves show the SPL at four increasing input levels. In a linear system, they should increase the same over the frequency of range, but in cases where a large radiating panel is backed by too small of an air space the SPL does not increase linearly with increasing power. Thus the curves show the low and high ends continually increasing at 3 dB per input level change while the mid band does not increase at the same rate.

By implementing proper compensation (level dependent equalization) more power can be supplied in the mid band frequencies to compensate and result in an even response as the volume is turned up as illustrated in FIG. 43.

In other words, the signal processing circuitry of the present invention is used for equalization of the headliner audio system to compensate for the nonlinearity of the headliner speaker system. At low levels, one equalization curve is applied to the audio signal to complement the response of the headliner speaker at these levels. However, as the signal level increases the shape of the frequency response of the headliner speaker system changes. To compensate, the equalization curve applied to the signal processing changes as well. This can also be used to compensate for the nonlinearity of the human hearing system (as is done in some home audio systems).

The method and system of the present invention rely on the acoustic properties of the headliner material such that the "coincidence frequency" is above the highest frequency signal fed to the headliner, whereas most panel radiators are optimized to operate above their coincidence frequency to increase efficiency. The materials of the headliner are optimized to maximize properties for a local radiation efficiency but also keep the flexural wave speed low enough that imaging and channel separation are optimized. Preferably, the loudspeaker panel materials have a coincidence frequency higher than 12 KHz.

Referring to FIG. 44, there is illustrated a view similar to FIG. 2 which not only shows a stereo system (on the right-hand side of the figure) but also a Dolby 5.1 system (on the left-hand side of the figure). As previously mentioned, the system of the invention is dynamically reconfigurable to accommodate multi-channel modes. The signal source and the equalization on every channel of FIG. 2 are not shown in FIG. 44 for purposes of simplicity.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An audio system for use in a vehicle having a roof, the system comprising:

a headliner adapted to be mounted adjacent the roof so as to underlie the roof and shield the roof from view, the headliner having an upper surface and a sound-radiating, lower surface;

a source of audio signals;

an array of electromagnetic transducer assemblies supported at the upper surface of the headliner, wherein each of the electromagnetic transducer assemblies includes a base supported by the upper surface of the headliner, a coil supported by the base, a spider supported by the base, and a permanent magnet supported by the spider;

signal processing circuitry coupled to the electromagnetic transducer assemblies for processing the audio signals to obtain processed audio signals wherein the coils and the spider-supported permanent magnets of the electromagnetic transducer assemblies cooperate to convert the processed audio signals into mechanical motion of corresponding zones of the headliner and wherein the headliner is made of a material which is sufficiently stiff to support the array of electromagnetic transducers and sufficiently flexible and low in density so that the headliner radiates acoustic power into the interior of the vehicle with a frequency range defined by a lower limit of 100 hertz or less and an upper limit of 12 kilohertz or more and the processed audio signals at a low end of the frequency range are matched to the processed audio signals at mid and high ends of the frequency range, wherein the headliner material has a flexural modulus between 1E7PA and 4E9PA and a density of between 100 and 800 kg/m3.

2. The system as claimed in claim 1 wherein the vehicle has a windshield and wherein the array of electromagnetic transducer assemblies includes at least one row of electromagnetic transducer assemblies adjacent the windshield and wherein the at least one row of electromagnetic transducer assemblies are positioned 5 to 30 inches in front or an expected position or a passenger in the interior of the vehicle.

3. The system as claimed in claim 2 wherein the at least one row of electromagnetic transducer assemblies are positioned 12 to 24 inches in front of the expected position of the passenger.

4. The system as claimed in claim 2 wherein the at least one row of electromagnetic transducer assemblies includes at least two electromagnetic transducer assemblies spaced apart to correspond to left and right ears of the passenger in the expected position of the passenger.

5. The system as claimed in claim 1 wherein each of the spider-supported permanent magnets establish a magnetic field in a gap formed within a corresponding electromagnetic transducer assembly, and each of the electromagnetic transducer assemblies further include a guide member removably secured to the base for supporting the coil in the gap.

6. The system as claimed in claim 5 wherein each of the permanent magnets is a high-energy permanent magnet.

7. The system as claimed in claim 6 wherein each of the high-energy permanent magnets is a rare-earth magnet.

8. The system as claimed in claim 5 wherein each of the electromagnetic transducer assemblies includes a spring element having a resonant frequency below the lower limit of the frequency range when incorporated within its transducer assembly and connected to its corresponding guide member for resiliently supporting its corresponding permanent magnet above the upper surface of the headliner.

9. The system as claimed in claim 1 wherein the array of electromagnetic transducer assemblies includes a front row of electromagnetic transducer assemblies positioned 5 to 30 inches in front of an expected position of a passenger in the interior of the vehicle and a back row of electromagnetic transducer assemblies positioned behind the expected position of the passenger wherein the signal processing circuitry delays the audio signals coupled to the back row of electromagnetic transducer assemblies relative to the audio signals coupled to the front row of electromagnetic transducer assemblies.

10. The system as claimed in claim 1 wherein the array of electromagnetic transducer assemblies are completely supported on the upper surface of the headliner.

11. The system as claimed in claim 1 further comprising at least one loudspeaker coupled to the signal processing circuitry, and adapted to be placed in the interior of the vehicle in front of an expected position of a passenger and below the headliner.

12. The system as claimed in claim 1 wherein the electromagnetic transducer assemblies are spaced to the left and right, front and rear of expected positions of passengers in the interior of the vehicle to create proper audio imaging for the passengers.

13. The system as claimed in claim 1 further comprising at least one loudspeaker positioned in front of expected positions of passengers below the headliner but not in doors, kick panels, or under a dash of the vehicle.

14. The system as claimed in claim 1 further comprising a low frequency speaker positioned below the headliner in the interior of the vehicle.

15. The system as claimed in claim 1 wherein the array of electromagnetic transducer assemblies has front and rear assemblies and wherein each rear electromagnetic transducer assembly is coupled to processed audio signals delayed in time relative to the processed audio signals coupled to each front electromagnetic transducer assembly.

16. The system as claimed in claim 1 wherein the audio signals are processed with head-related transfer functions by the signal processing circuitry.

17. The system as claimed in claim 1 wherein the electromagnetic transducer assemblies are supported only on the headliner.

18. The system as claimed in claim 1 wherein the headliner is self-supporting.

19. The system as claimed in claim 1 further comprising a semi-compliant attachment mechanism adapted to attach the headliner to the roof along at least a substantial periphery of the roof.

20. The system as claimed in claim 1 further comprising a semi-compliant attachment mechanism adapted to attach the headliner to the roof along at least a substantial periphery of the roof and a central portion of the roof.

21. The system as claimed in claim 1 further comprising a support structure for reinforcing the headliner.

22. The system as claimed in claim 1 further comprising framing independent of the headliner to support the assemblies.

23. The system as claimed in claim 1 wherein the headliner material may be made from a single material or composites.

24. The system as claimed in claim 1 wherein stiffness and density of the headliner material is altered around the entire periphery of the headliner to allow for additional excursion of the entire headliner in order to create better low frequency reproduction (<200 Hz) of the processed audio signals.

25. The system as claimed in claim 1 further comprising a fabric or other material adhered to the lower surface of the headliner to create a cosmetically acceptable appearance for the system.

26. The system as claimed in claim 1 further comprising a fabric or other material adhered to the upper surface of the headliner for routing wires over the headliner in order to keep the wires from vibrating when in contact with a vibrating headliner.

27. The system as claimed in claim 1 further comprising audio signal wires integrated into the headliner.

28. The system as claimed in claim 1 further comprising a material adhered to the headliner to provide additional mass or damping or stiffness thereby minimizing unwanted excess vibration caused by any resonances in the headliner material.

29. The system as claimed in claim 1 further comprising fiberglass or other suitable material positioned between the headliner and the roof to minimize undesirable acoustical reflections from the roof, to minimize standing waves set up in a cavity created between the headliner and the roof and to prevent the array of electromagnetic transducer assemblies from engaging the roof.

30. The system as claimed in claim 1 wherein a electromagnetic transducer assembly for a local sound zone is located between 5" and 30" in front of an expected ear location for a passenger.

31. The system as claimed in claim 1 wherein at least one of the electromagnetic transducer assemblies is adhered directly to the headliner.

32. The system as claimed in claim 1 wherein each of the electromagnetic transducer assemblies includes a subassembly having vibrational characteristics and adapted to be screwed, snapped, or twisted into position at the upper surface of the headliner whereby vibrational characteristics of each of the subassemblies can be tested for performance and quality prior to its installation on the headliner.

33. The system as claimed in claim 32 wherein each of the assemblies includes a base fixedly secured to the headliner and a bayonet-style coupling for removably securing its corresponding subassembly to its base and wherein each coupling also makes electrical contact between a conductor which is coupled to the circuitry and its corresponding subassembly.

34. The system as claimed in claim 1 wherein the processed audio signals to be delivered to each electromagnetic transducer assembly may be routed to alternate electromagnetic transducer assemblies to achieve different imaging and performance goals, the processed audio signals being monaural, stereo, or multi-channel signals.

35. The system as claimed in claim 1 wherein an acoustical center channel signal in a multi-channel setup is achieved by sending a processed center channel signal to both left and right channel electromagnetic transducer assemblies in a row of electromagnetic transducer assemblies and utilizing mechanical mixing of the headliner to move the headliner between the left and right channel electromagnetic transducer assemblies as a center channel speaker.

36. The system as claimed in claim 1 further comprising a compliant material positioned between the electromagnetic transducer assemblies and the roof.

37. The system as claimed in claim 1 further comprising at least one microphone positioned in the interior of the vehicle for intra-cabin and extra-cabin communications.

38. The system as claimed in claim 1 wherein the processed audio signals represent global or local vehicle warnings delivered to the entire or local interior sections of the vehicle.

39. The system as claimed in claim 1 wherein the signal processing circuitry utilizes adaptive filtering techniques to perform automatic system equalization.

40. The system as claimed in claim 1 wherein each area in the interior of the vehicle can be separately equalized.

41. The system as claimed in claim 1 wherein the headliner has a relatively high coincidence frequency to maximize channel separation, provide accurate imaging and minimize distortion and wherein the coincidence frequency is greater than 12 KHz.

42. The system as claimed in claim 1 wherein the audio signals are processed with trans-aural techniques to widen or narrow an image.

43. The system as claimed in claim 1 wherein the headliner has a structure which is broken at a flexure to minimize transfer of mechanical motion across the flexure.

44. The system as claimed in claim 1 wherein the system has a frequency response shape wherein the signal processing circuitry changes the shape of an equalization curve applied to the audio signals based on the signal level of the audio signals to maintain the frequency response shape relatively constant as the signal level of the audio signals change.

45. The system as claimed in claim 1 wherein the coil includes at least one conductive pin for coupling the coil to the audio signals.

46. The system as claimed in claim 1 wherein each of the electromagnetic transducer assemblies comprises the base and a subassembly having:

the permanent magnet;

the coil;

the spider;

a housing supported by the spider, the housing having a cavity for accepting the permanent magnet such that the permanent magnet establishes a magnetic field within the cavity; and a guide member for supporting the coil centrally within the magnetic field.

47. The system as claimed in claim 46 wherein the subassembly is configured to removably secure to the base by screwing, snapping or twisting.

48. The system as claimed in claim 47 further comprising a bayonet-style coupling for mechanically connecting the spider and guide member to the base and electrically connecting the coil to a cable which supplies the audio signal after rotation of the spider and guide member relative to the base under a biasing force.

49. The system as claimed in claim 48 wherein the bayonet-style coupling includes an electrically conductive spring electrically connected to the coil and supported on the spider and guide member for supplying the biasing force and electrically connecting the coil to the cable.

50. The system as claimed in claim 47 further comprising at least one electrically conductive member disposed between the spider and guide member and the base for electrically coupling the coil to a flat flexible cable disposed between the spider and guide member and the base upon securing the subassembly to the mating base.

51. The system as claimed in claim 50 wherein the at least one electrically conductive member includes a pair of spaced electrically conductive springs which urge the spider and guide member away from the base during securing of the subassembly to the base.

52. The system as claimed in claim 46 wherein the spider includes a plurality of flexing legs circumferentially spaced about an outer periphery of the spider.

53. The system as claimed in claim 52 wherein each of the flexing legs has a shape of a sinusoidal wave.

54. The system as claimed in claim 52 wherein each of the flexing legs has a pair of end portions which taper to a relatively thin middle portion.

55. The system as claimed in claim 54 wherein each of the flexing legs has at least one edge profile which follows a cosine function.

56. The system as claimed in claim 46 wherein the spider and guide member form a single part.

57. The system as claimed in claim 46 wherein the coil includes a notch for aligning the coil on the guide member to insure proper polarity of the coil.

58. The system as claimed in claim 46 wherein the spider has threads for securing the spider to the housing.

59. The system as claimed in claim 58 further comprising an adhesive to adhesively secure the housing to the spider at the threads.

60. The system as claimed in claim 46 wherein the spider and guide member include a centering ledge portion for centering the housing on the spider and guide member.

* * * * *

UNITED STATES PATENT AND TRADEMARK OFFICE

CERTIFICATE OF CORRECTION

PATENT NO. : 7,853,025 B2
APPLICATION NO. : 11/251980
DATED : December 14, 2010
INVENTOR(S) : Pawel Sleboda et al.

It is certified that error appears in the above-identified patent and that said Letters Patent is hereby corrected as shown below:

Column 15, Line 58, Claim 2:

After “in front” delete “or” and insert -- of --.

Column 15, Line 60, Claim 2:

After “expected position” delete “or” and insert -- of --.

Column 17, Line 43, Claim 30:

After “claim 1 wherein” delete “a” and insert -- an --.

Column 20, Line 11, Claim 57:

Delete “insure” and insert -- ensure --.

Signed and Sealed this
Fifteenth Day of March, 2011

David J. Kappos
*Director of the United States Patent and Trademark Office*